(12) United States Patent
Nishida et al.

(10) Patent No.: US 12,551,119 B2
(45) Date of Patent: Feb. 17, 2026

(54) BLOOD PRESSURE MEASUREMENT DEVICE

(71) Applicants: OMRON Corporation, Kyoto (JP); OMRON HEALTHCARE Co., Ltd., Kyoto (JP)

(72) Inventors: Tomoyuki Nishida, Kyoto (JP); Yuichiro Arima, Kyoto (JP); Takashi Ono, Kyoto (JP); Chisato Tawara, Kyoto (JP); Keitaro Nagano, Kyoto (JP)

(73) Assignees: OMRON CORPORATION, Kyoto (JP); OMRON HEALTHCARE CO., LTD., Kyoto (JP)

( * ) Notice: Subject to any disclaimer, the term of this patent is extended or adjusted under 35 U.S.C. 154(b) by 736 days.

(21) Appl. No.: 17/303,810

(22) Filed: Jun. 8, 2021

(65) Prior Publication Data

US 2021/0290090 A1    Sep. 23, 2021

Related U.S. Application Data

(63) Continuation of application No. PCT/JP2019/047164, filed on Dec. 3, 2019.

(30) Foreign Application Priority Data

Dec. 13, 2018   (JP) .................................. 2018-233398

(51) Int. Cl.
*A61B 5/022*    (2006.01)
*A61B 5/00*     (2006.01)
*A61B 5/021*    (2006.01)

(52) U.S. Cl.
CPC ...... *A61B 5/02233* (2013.01); *A61B 5/02141* (2013.01); *A61B 5/6824* (2013.01)

(58) Field of Classification Search
None
See application file for complete search history.

(56) References Cited

U.S. PATENT DOCUMENTS

| | | |
|---|---|---|
| 2006/0129049 A1 | 6/2006 | Sano et al. |
| 2006/0135872 A1 | 6/2006 | Karo et al. |

(Continued)

FOREIGN PATENT DOCUMENTS

| | | |
|---|---|---|
| CN | 1785116 | 6/2006 |
| CN | 1792321 | 6/2006 |

(Continued)

OTHER PUBLICATIONS

Translation of JPH07255686-A (Year: 1995).*

(Continued)

*Primary Examiner* — Tse W Chen
*Assistant Examiner* — Martin Nathan Ortega
(74) *Attorney, Agent, or Firm* — Wenderoth, Lind & Ponack, L.L.P.

(57) ABSTRACT

A blood pressure measurement device includes a curler that curves to follow a circumferential direction of a site of a living body where the curler is attached, and a cuff. The cuff includes a plurality of bag-like structures layered on one another, each of the plurality of bag-like structures being elongated in one direction, formed by welding two sheet members formed of a resin material, and configured to be inflated with a fluid, and a joined portion provided on at least a portion of an edge portion of the bag-like structure disposed facing the curler, the joined portion being formed by a portion of the sheet members constituting the bag-like structure disposed facing the curler and joined to an outer circumferential surface side of the curler.

9 Claims, 28 Drawing Sheets

(56) References Cited

U.S. PATENT DOCUMENTS

2006/0135873 A1* 6/2006 Karo .................. A61B 5/02233
                                                    600/499
2016/0029910 A1* 2/2016 Taniguchi .............. A61B 5/022
                                                    600/499
2018/0279889 A1* 10/2018 Lee .................... A61B 5/02444

FOREIGN PATENT DOCUMENTS

| JP | 62-164003    |   | 10/1987 |
|----|--------------|---|---------|
| JP | 7-255686     |   | 10/1995 |
| JP | H07255686 A  | * | 10/1995 |
| JP | 2006-174861 A |  | 7/2006  |
| JP | 2018-102743 A |  | 7/2018  |

OTHER PUBLICATIONS

International Preliminary Report on Patentability issued Jun. 17, 2021 in International (PCT) Patent Application No. PCT/JP2019/047164.
Chinese Office Action issued Oct. 12, 2023 in corresponding Chinese Patent Application No. 201980074455.9, with English machine translation.
Second Office Action issued May 28, 2024 in corresponding Chinese Patent Application No. 201980074455.9, with English-language Translation.

* cited by examiner

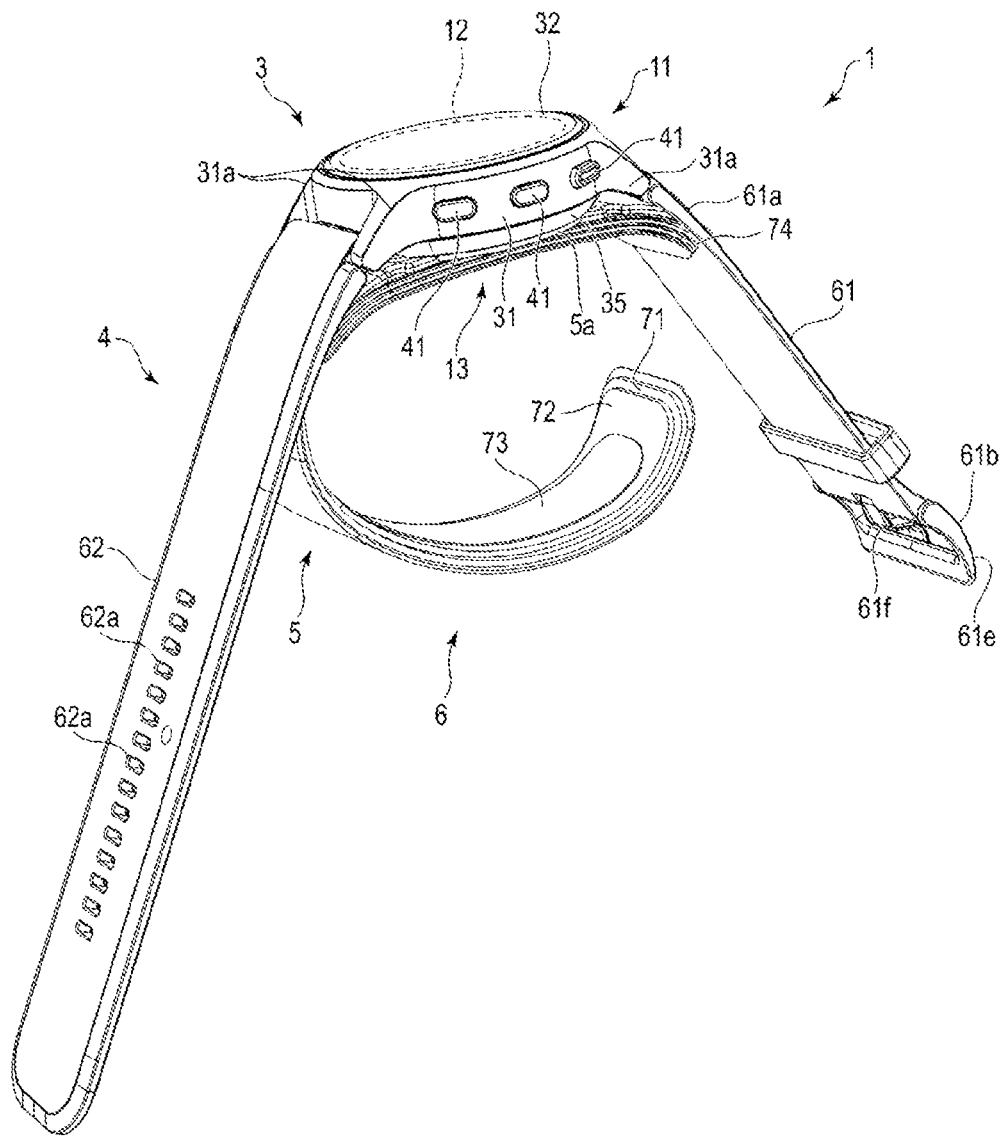
[FIG. 1]

[FIG. 2]
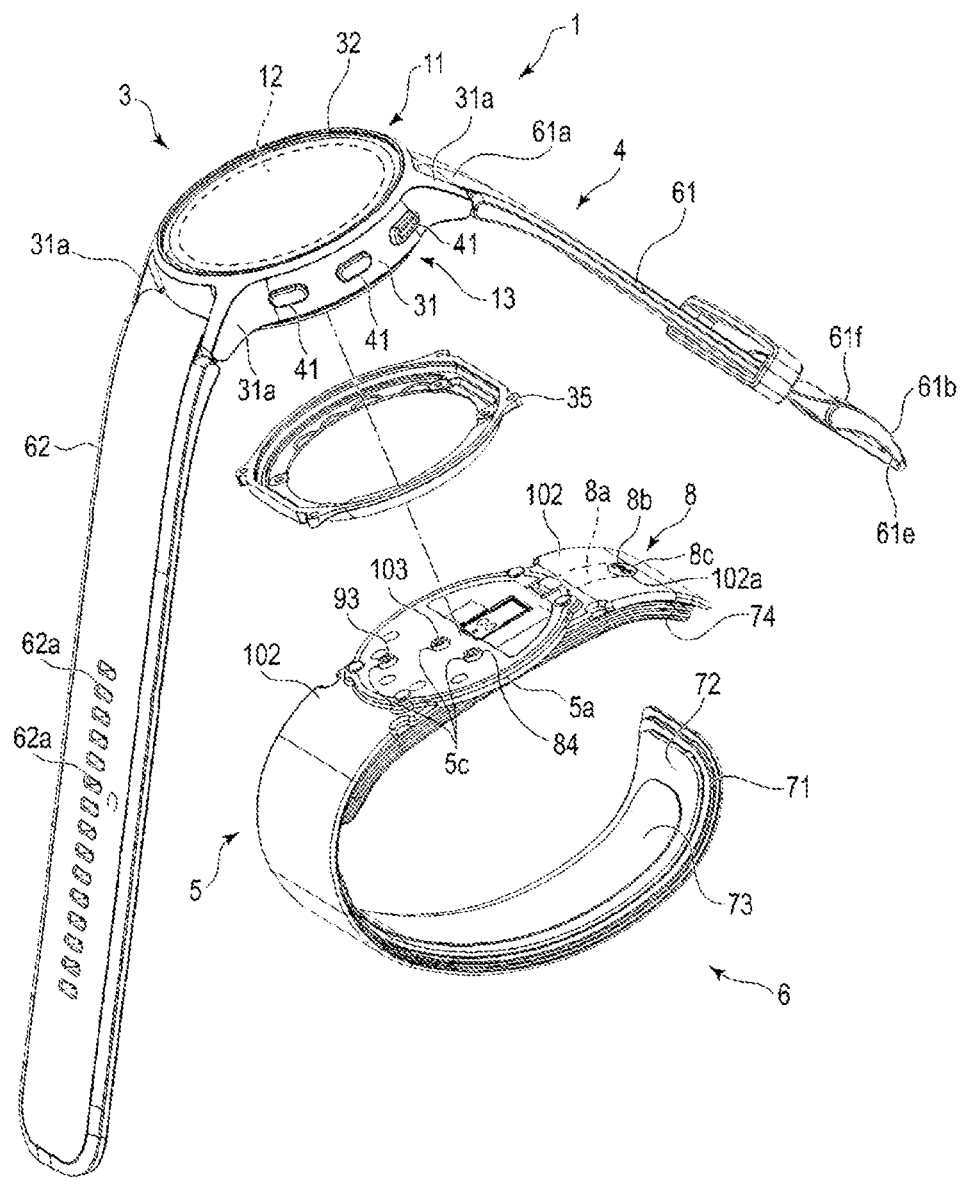

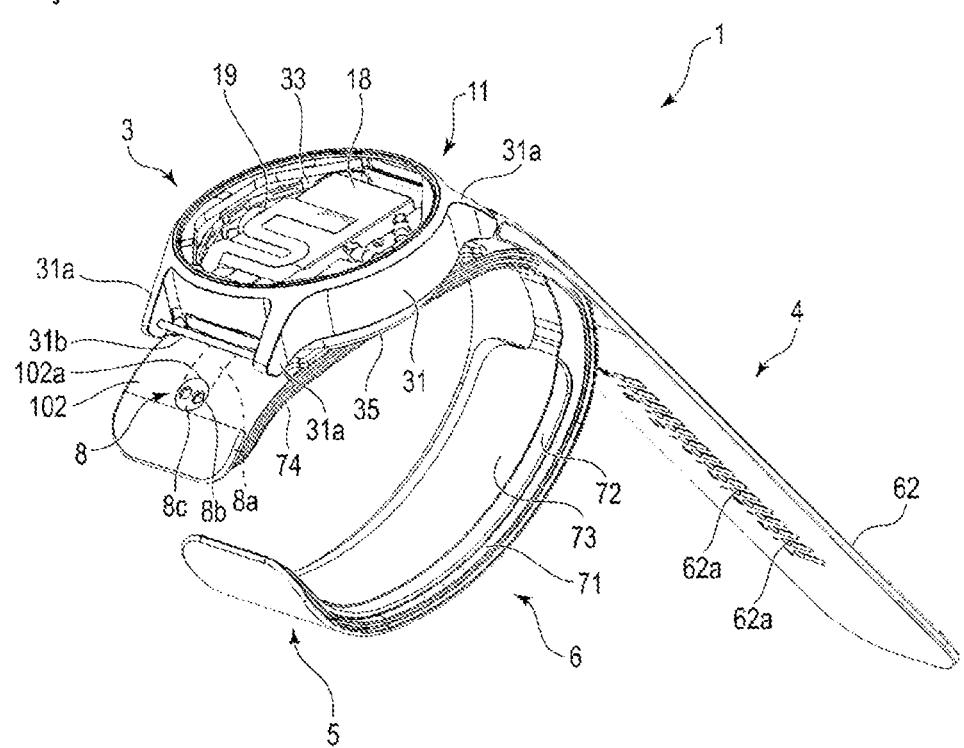
[FIG. 3]

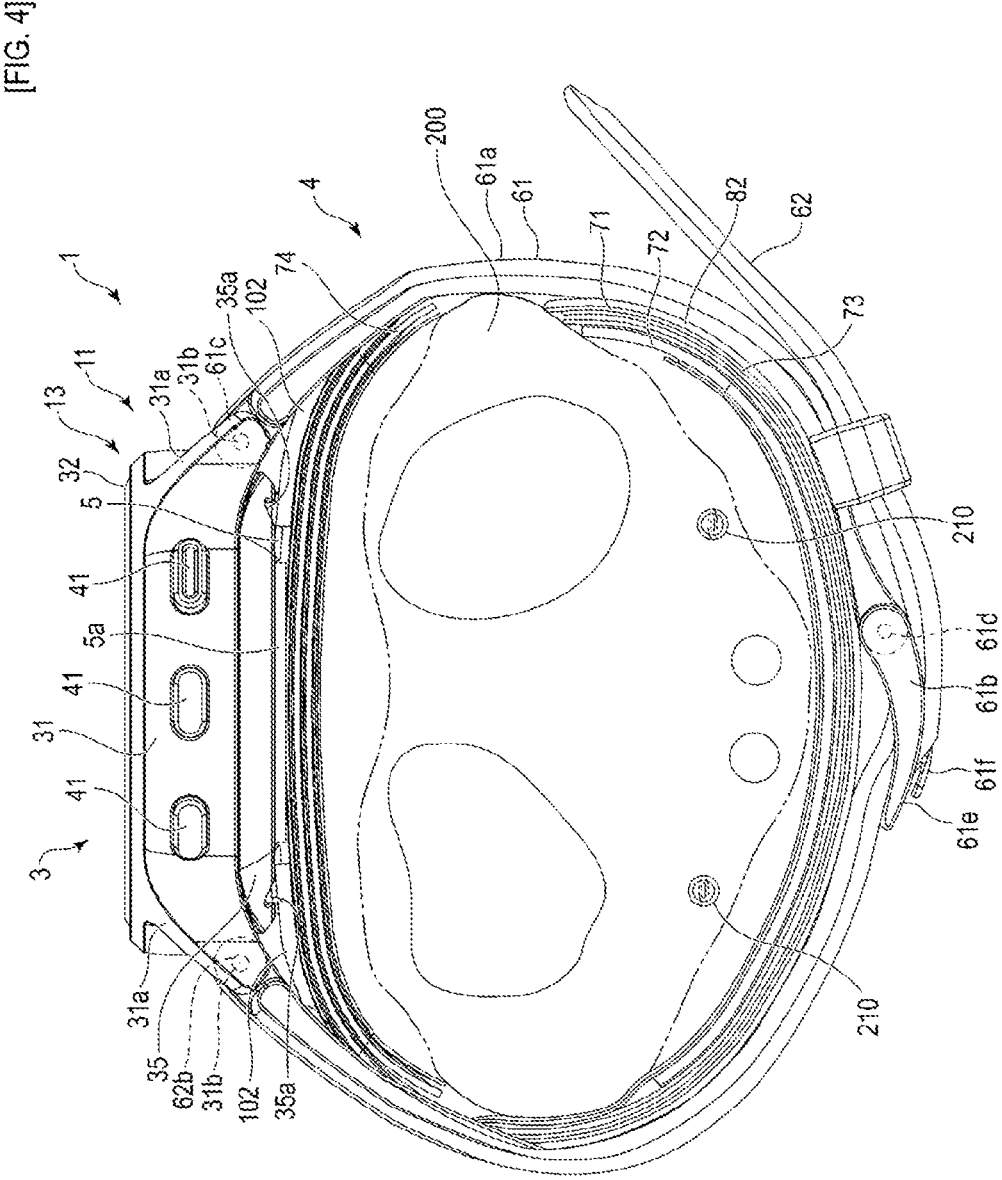
[FIG. 4]

[FIG. 5]
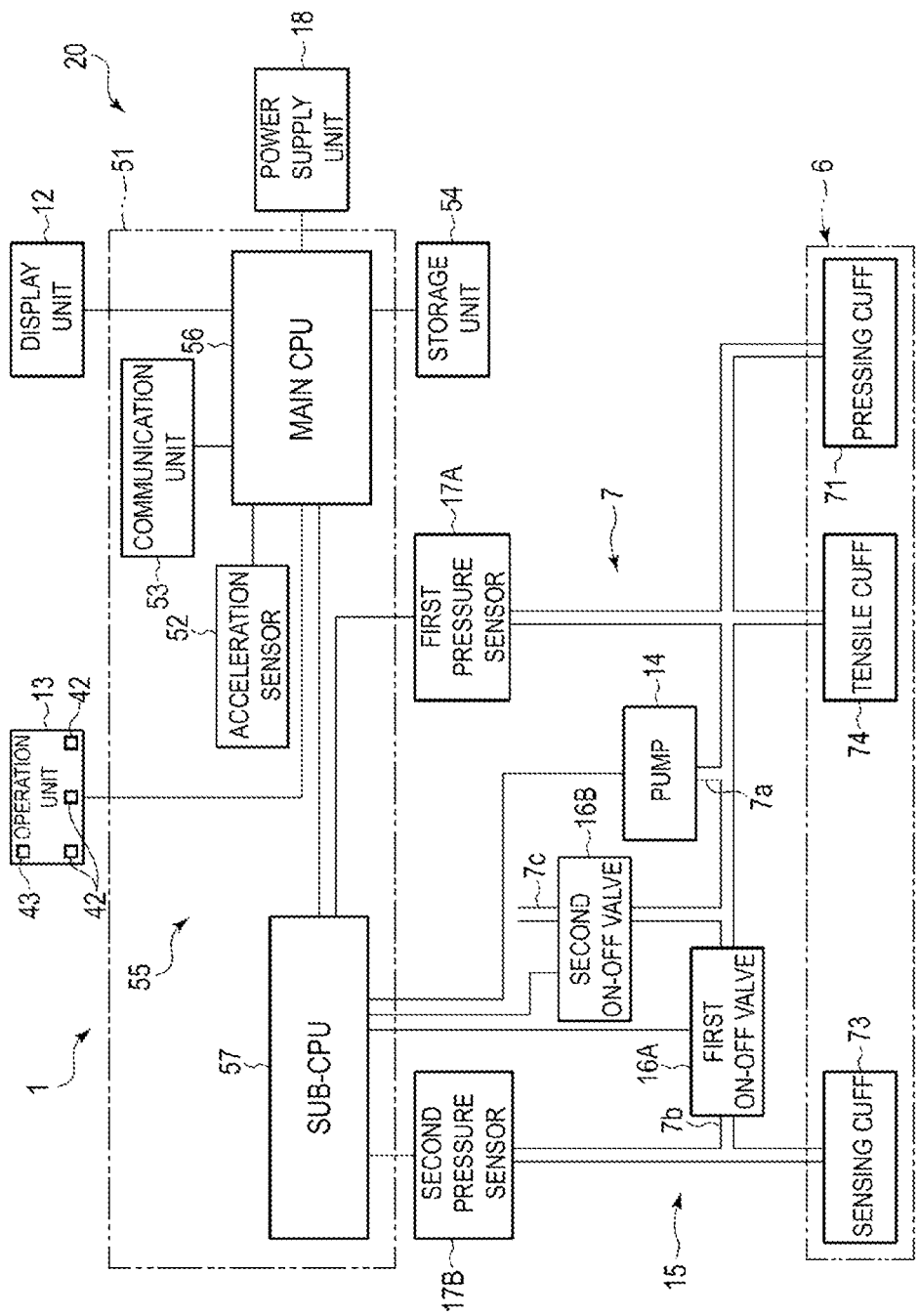

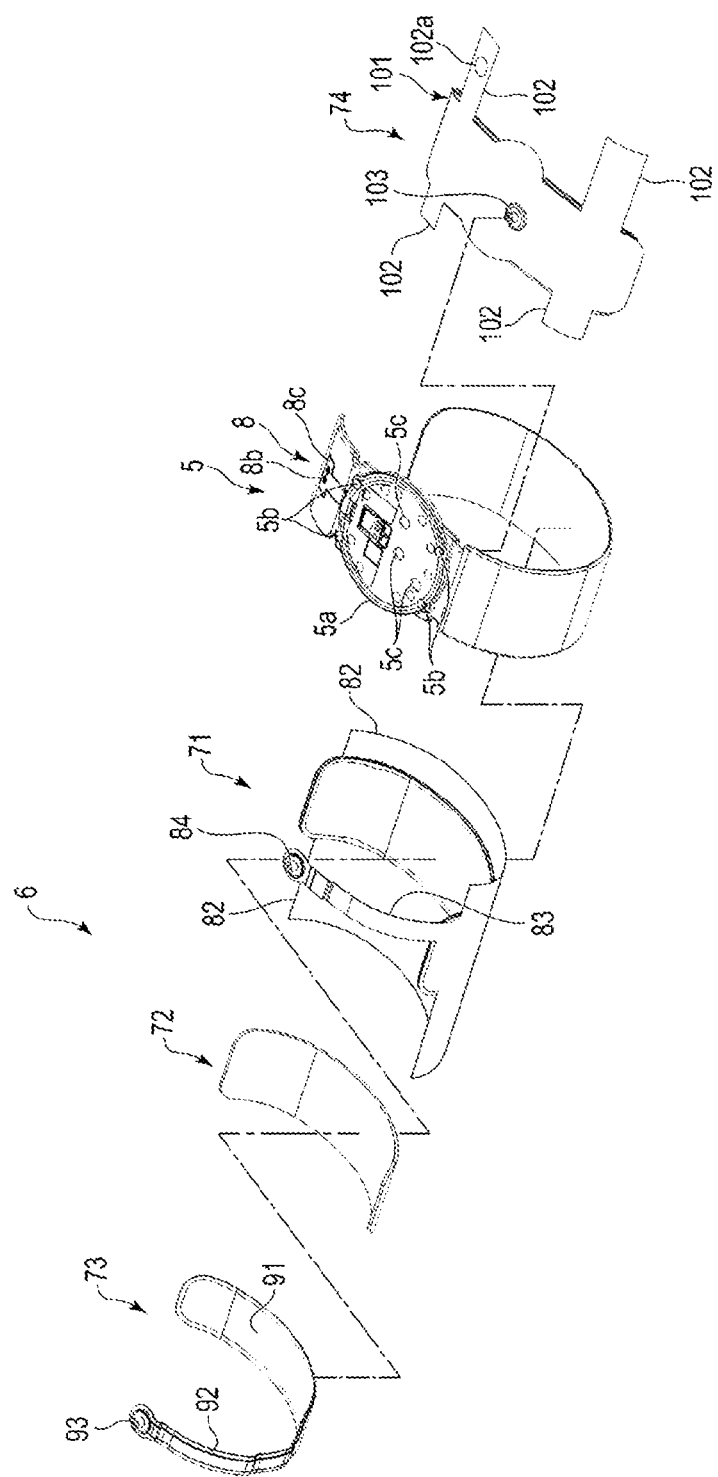
[FIG. 6]

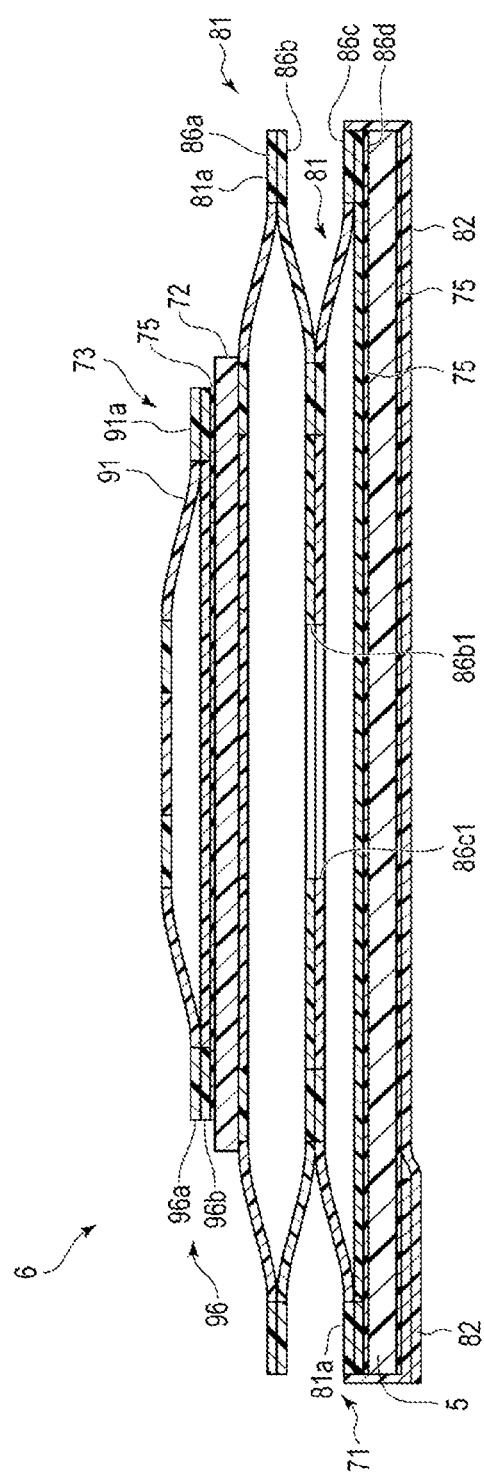
[FIG. 7]

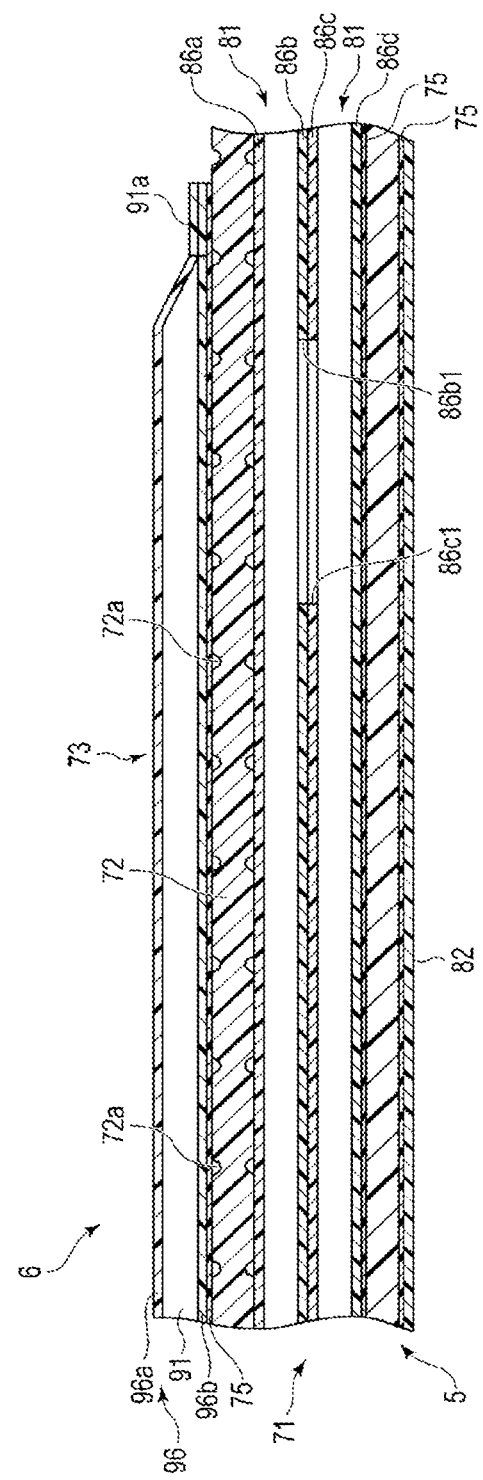

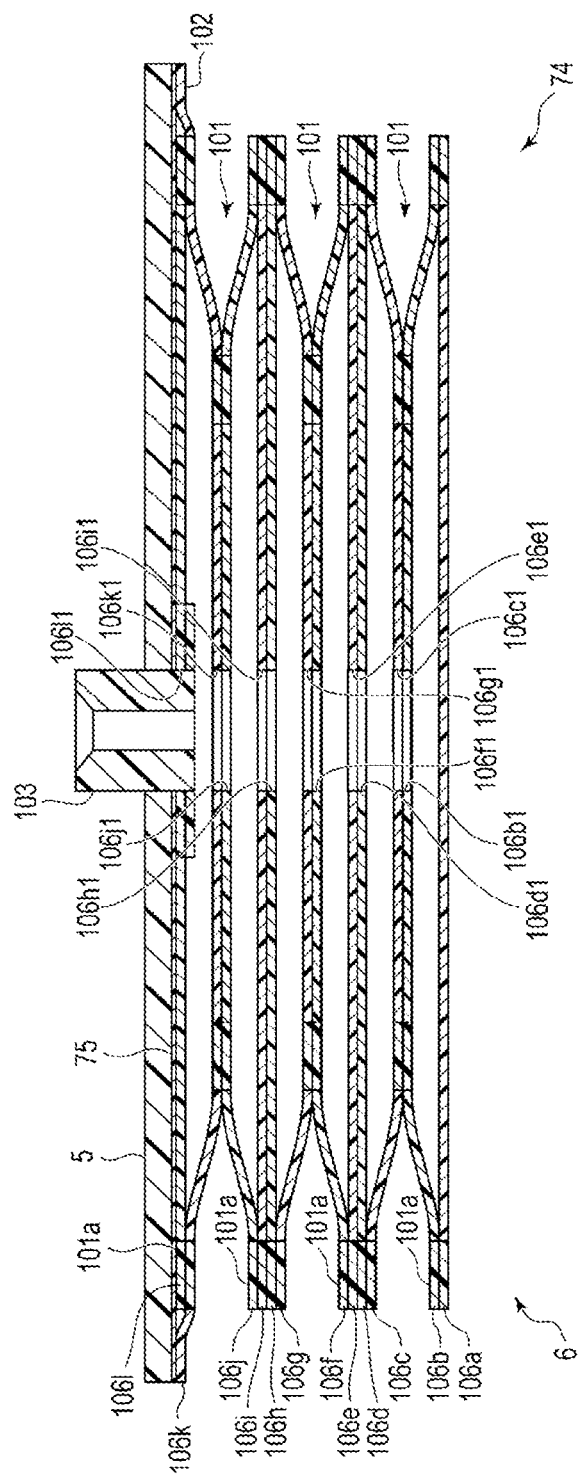
[FIG. 9]

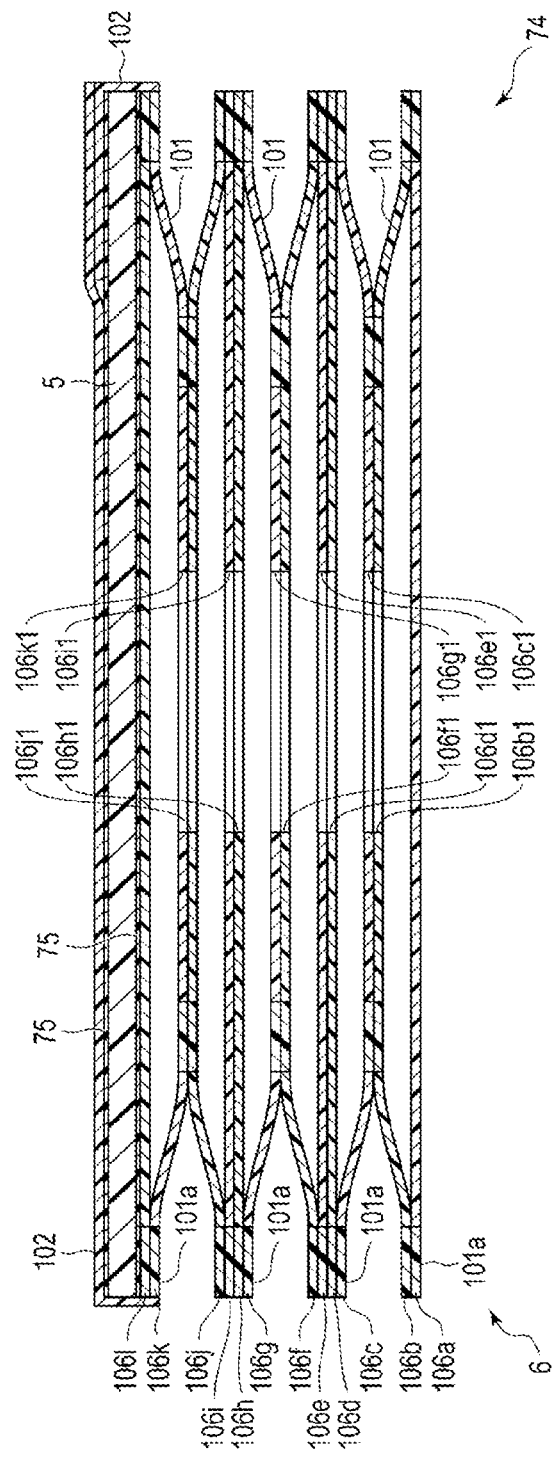
[FIG. 10]

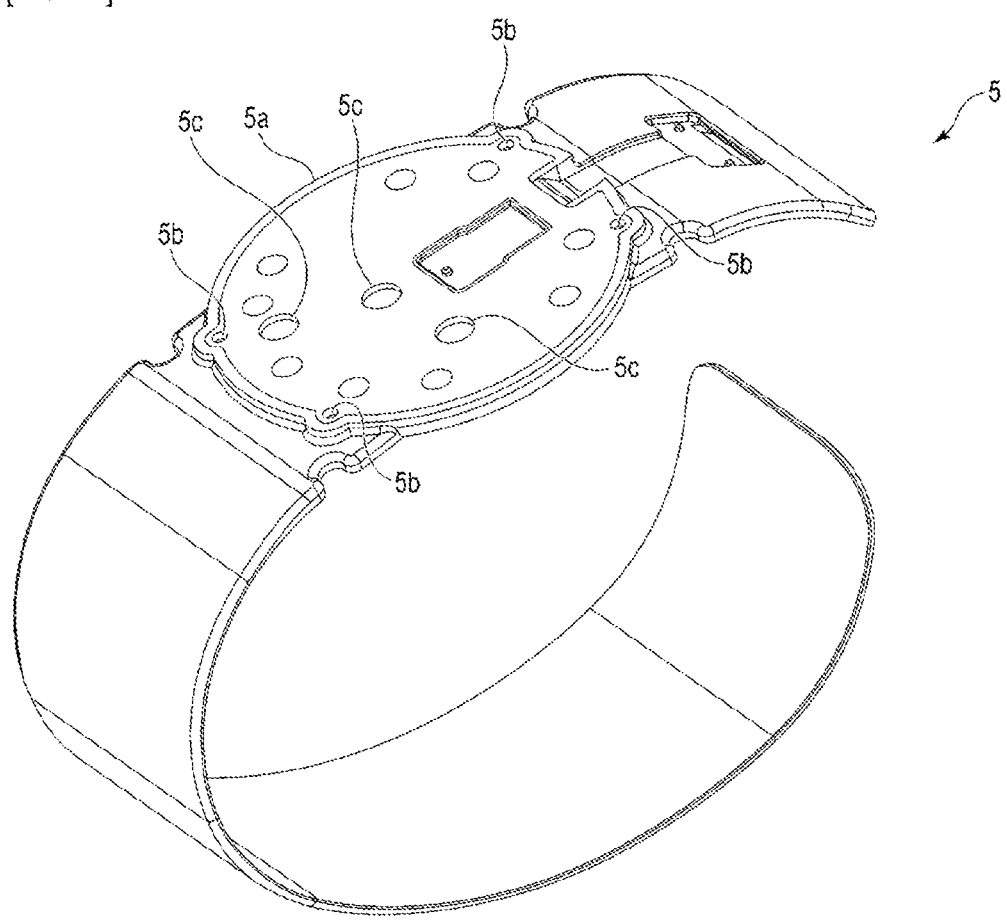
[FIG. 11]

[FIG. 12]
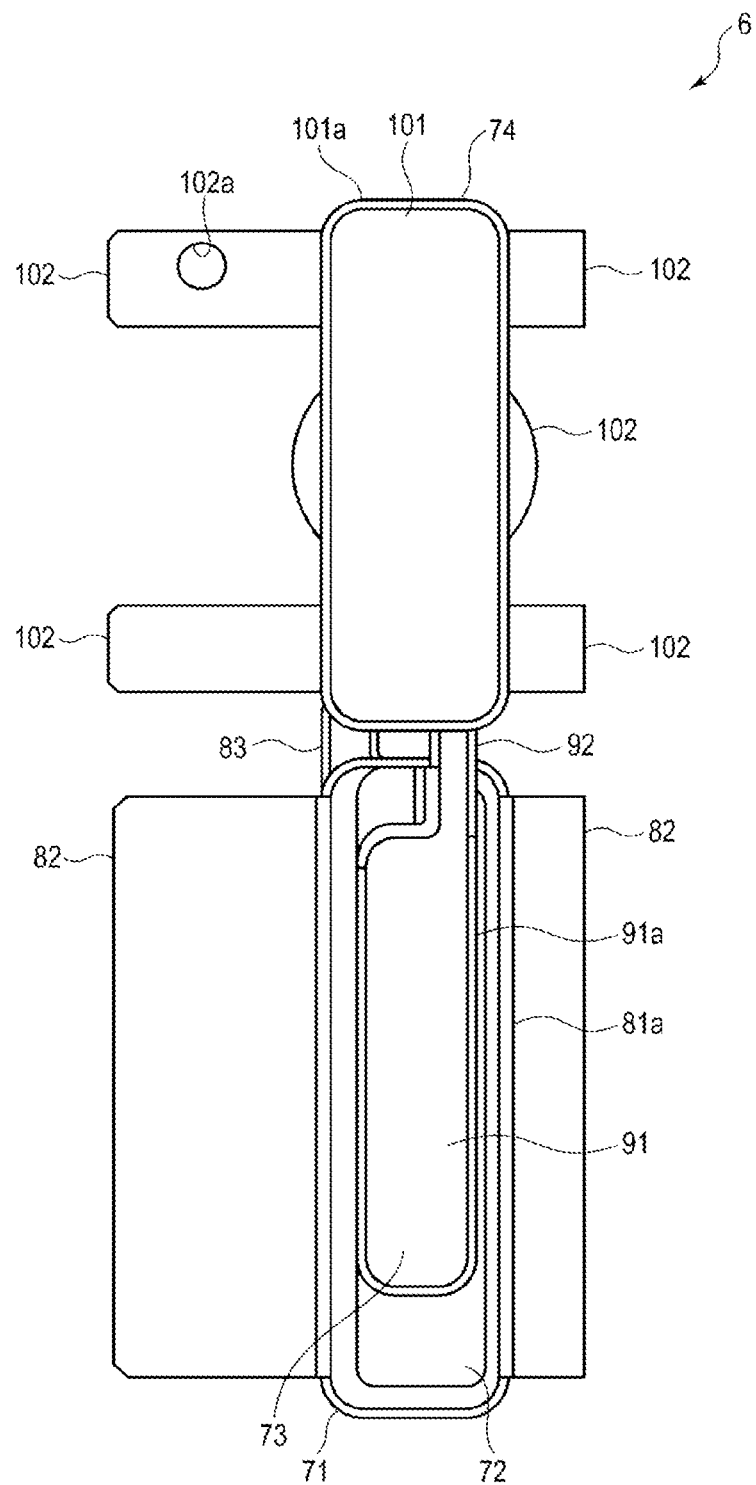

[FIG. 13]
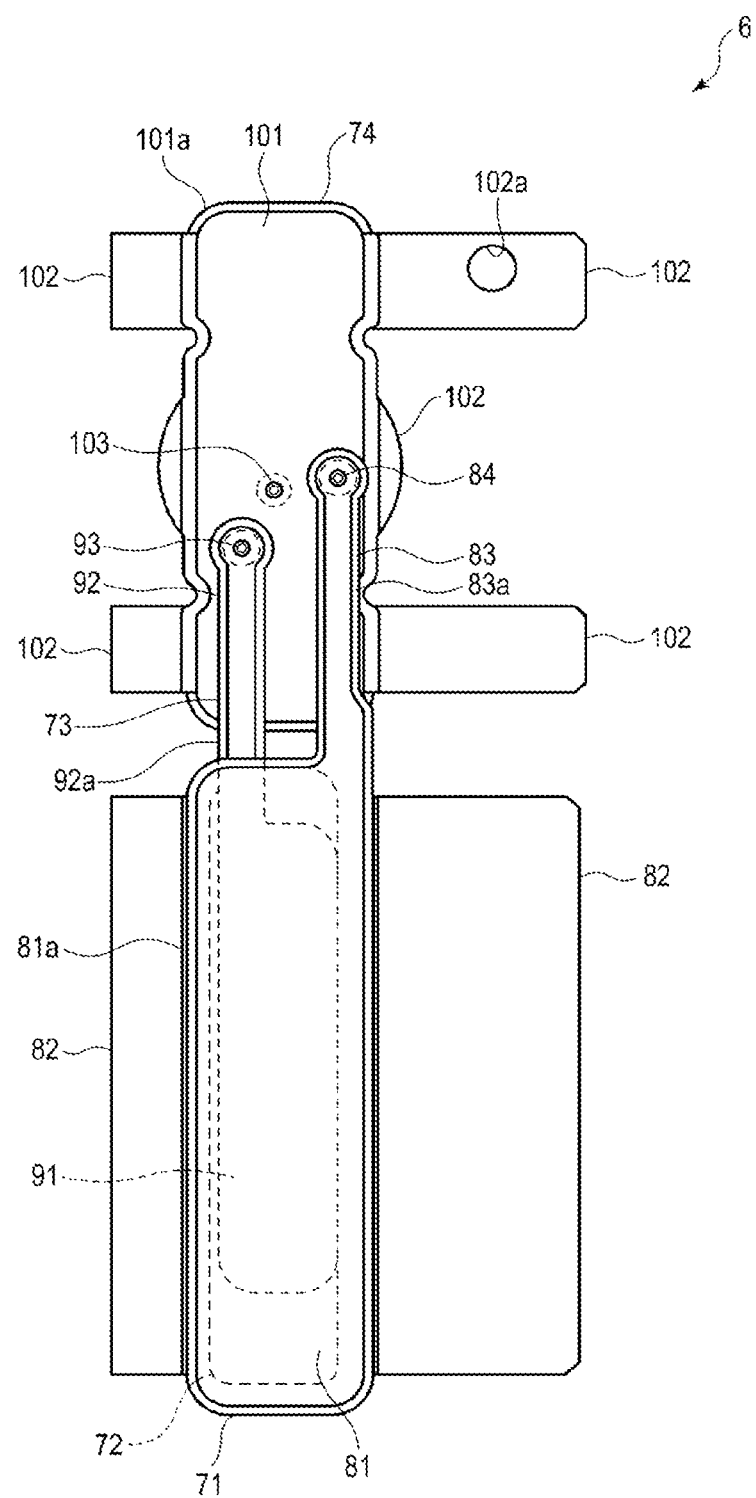

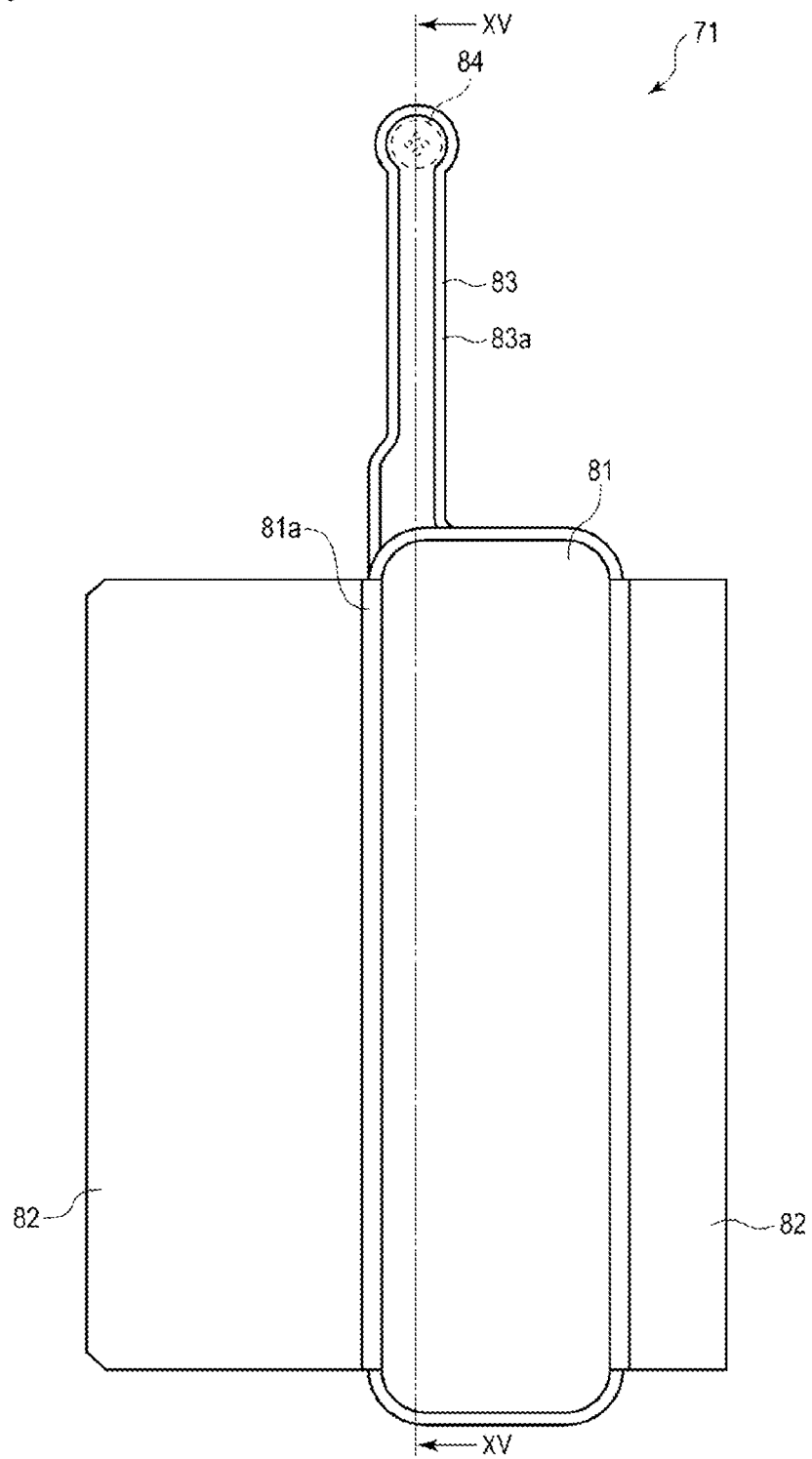
[FIG. 14]

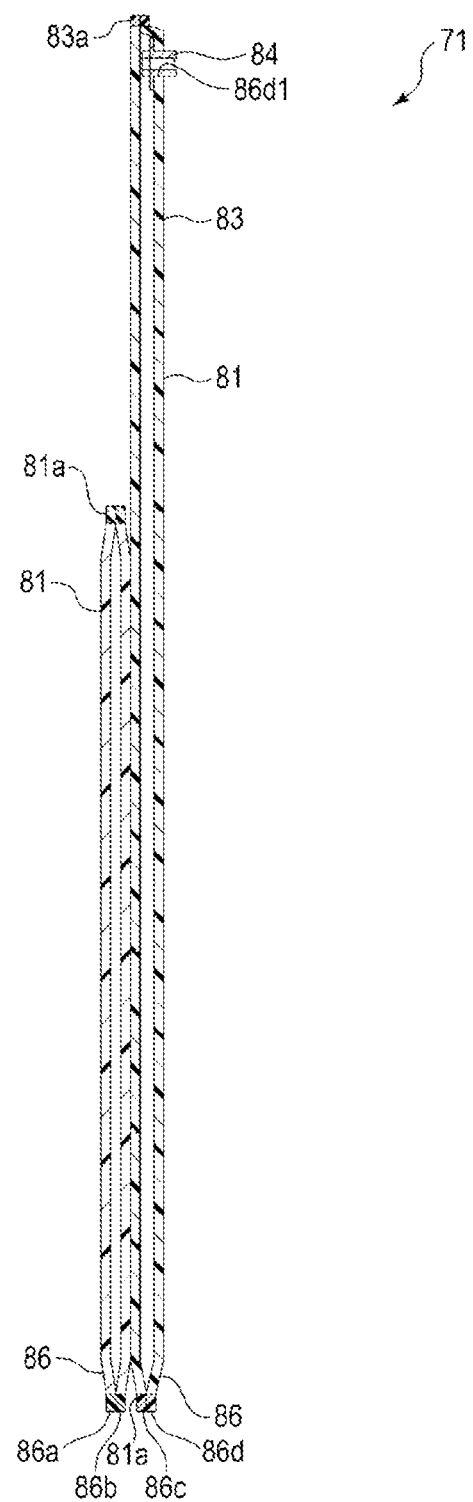
[FIG. 15]

[FIG. 16]
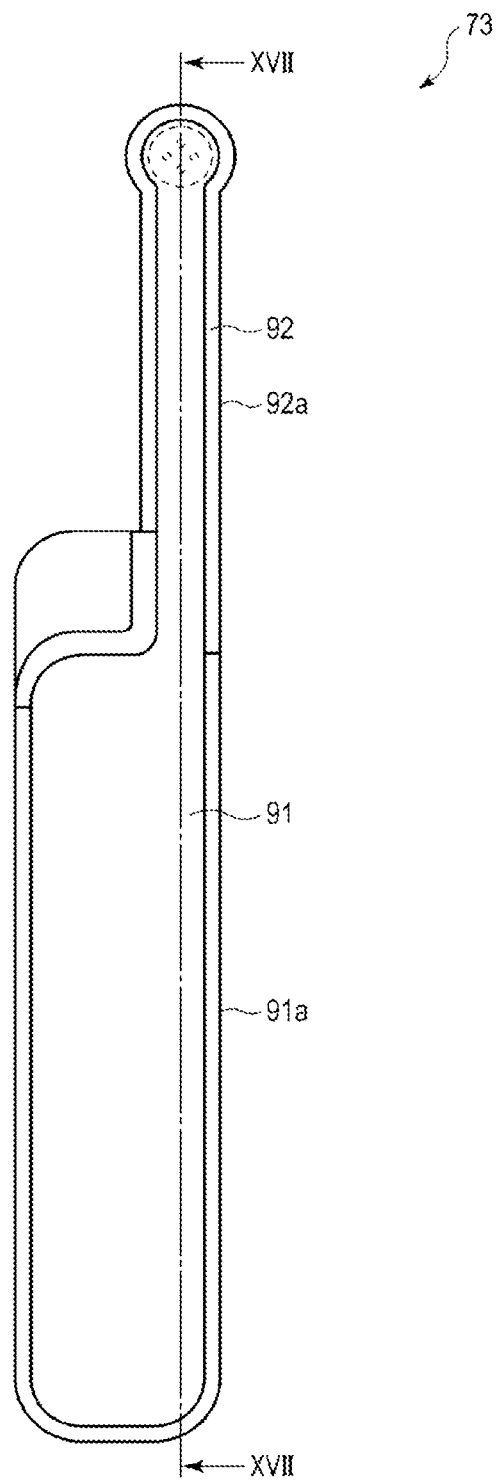

[FIG. 17]
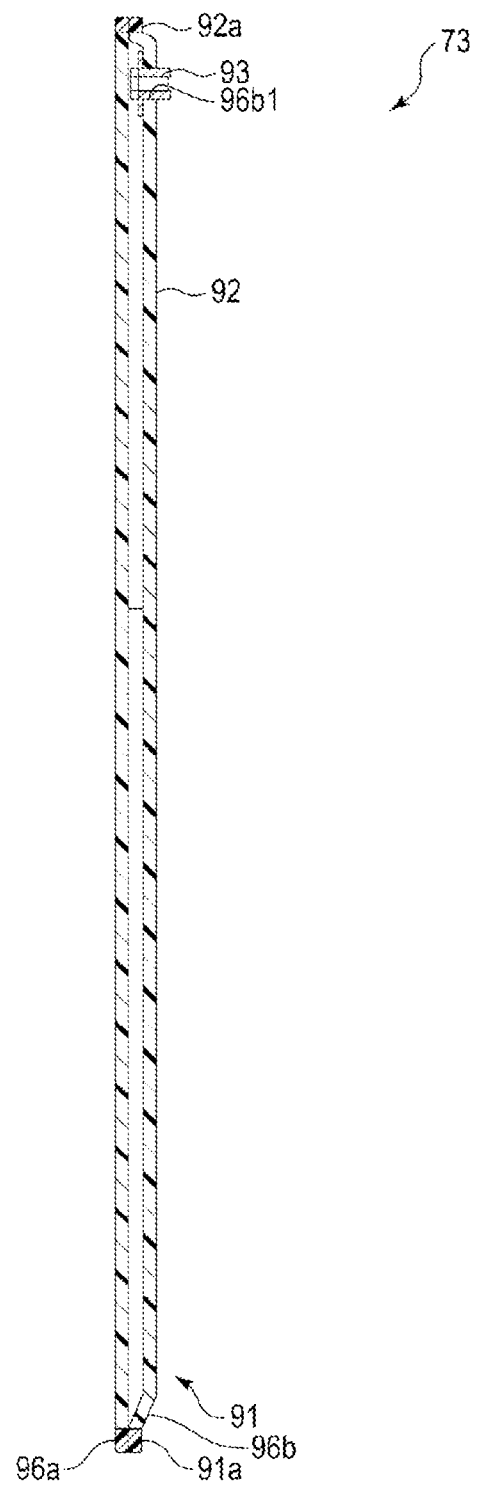

[FIG. 18]
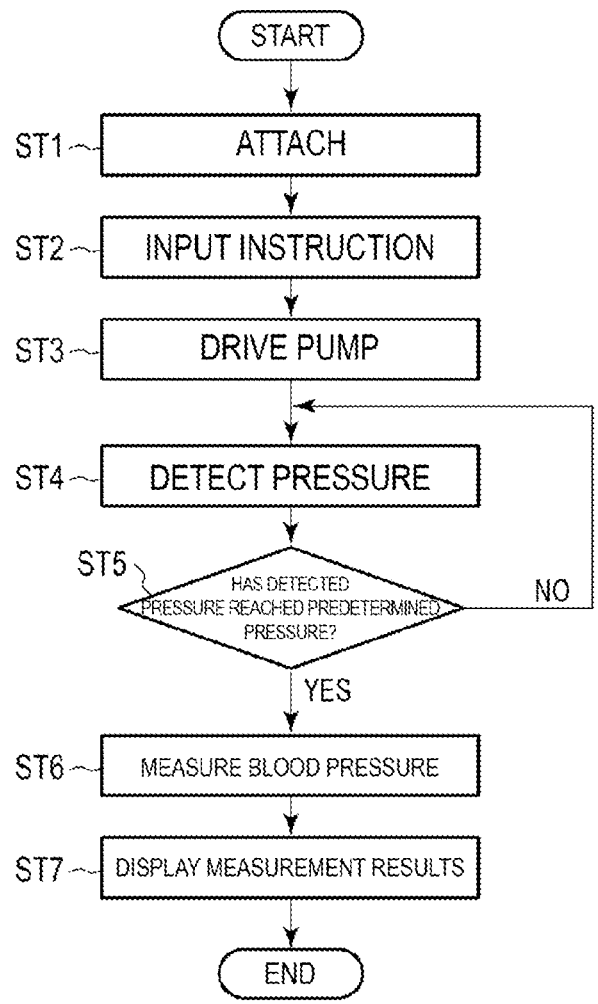

[FIG. 19]
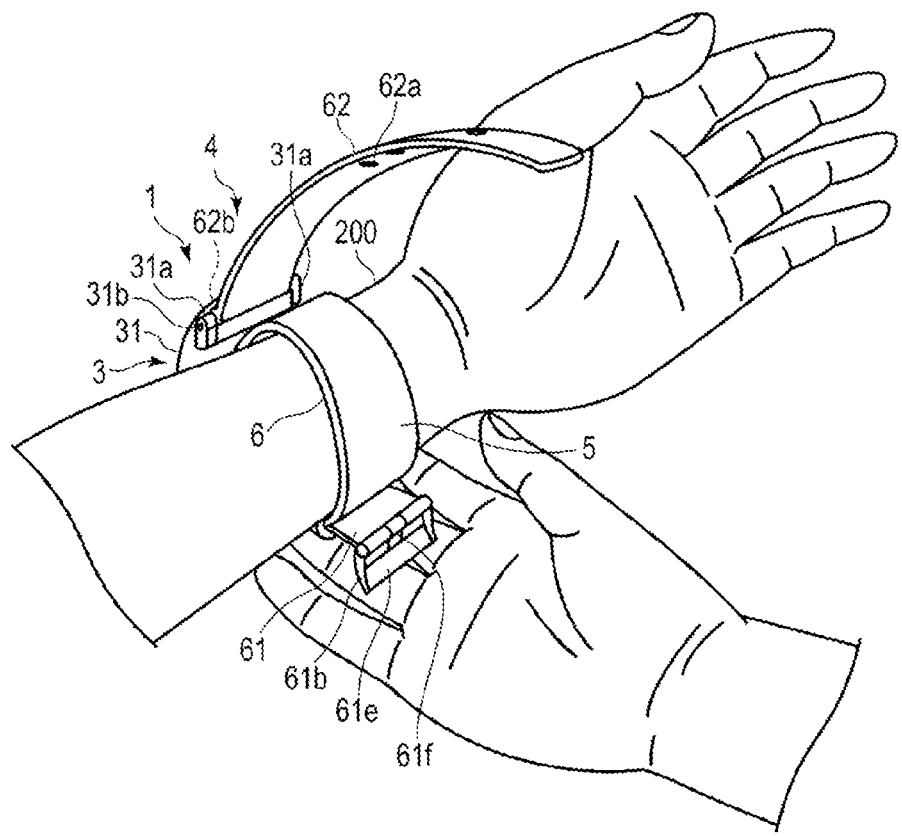

[FIG. 20]
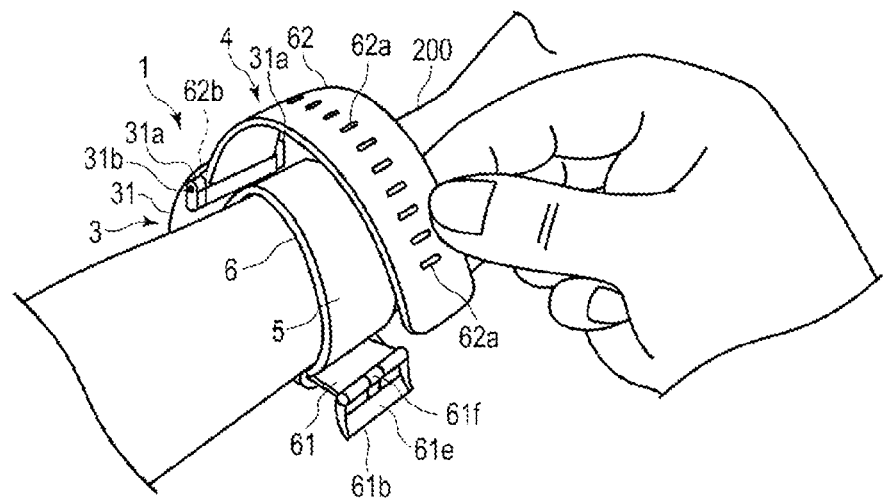
[FIG. 21]
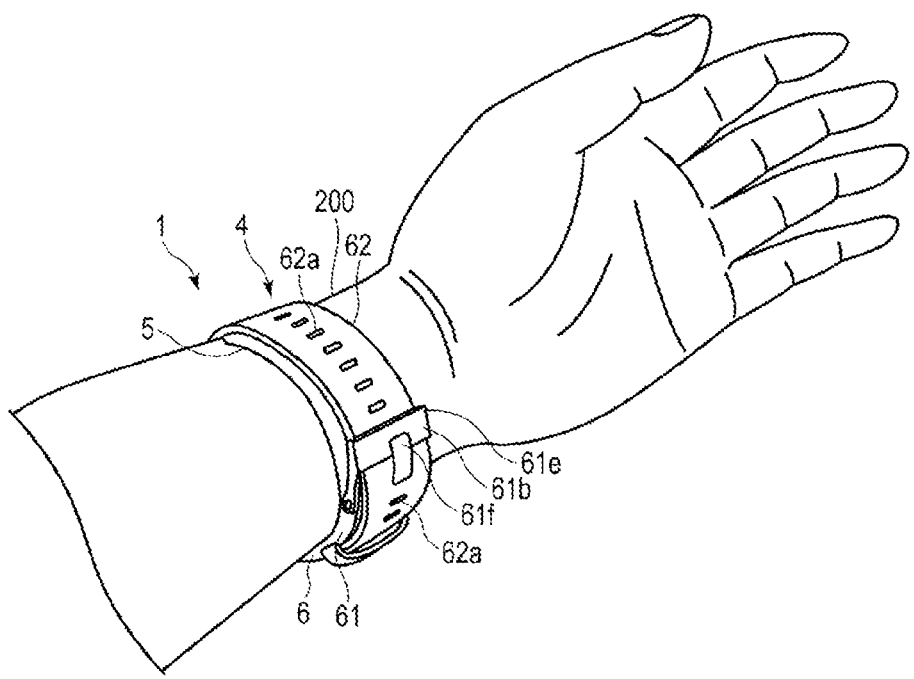

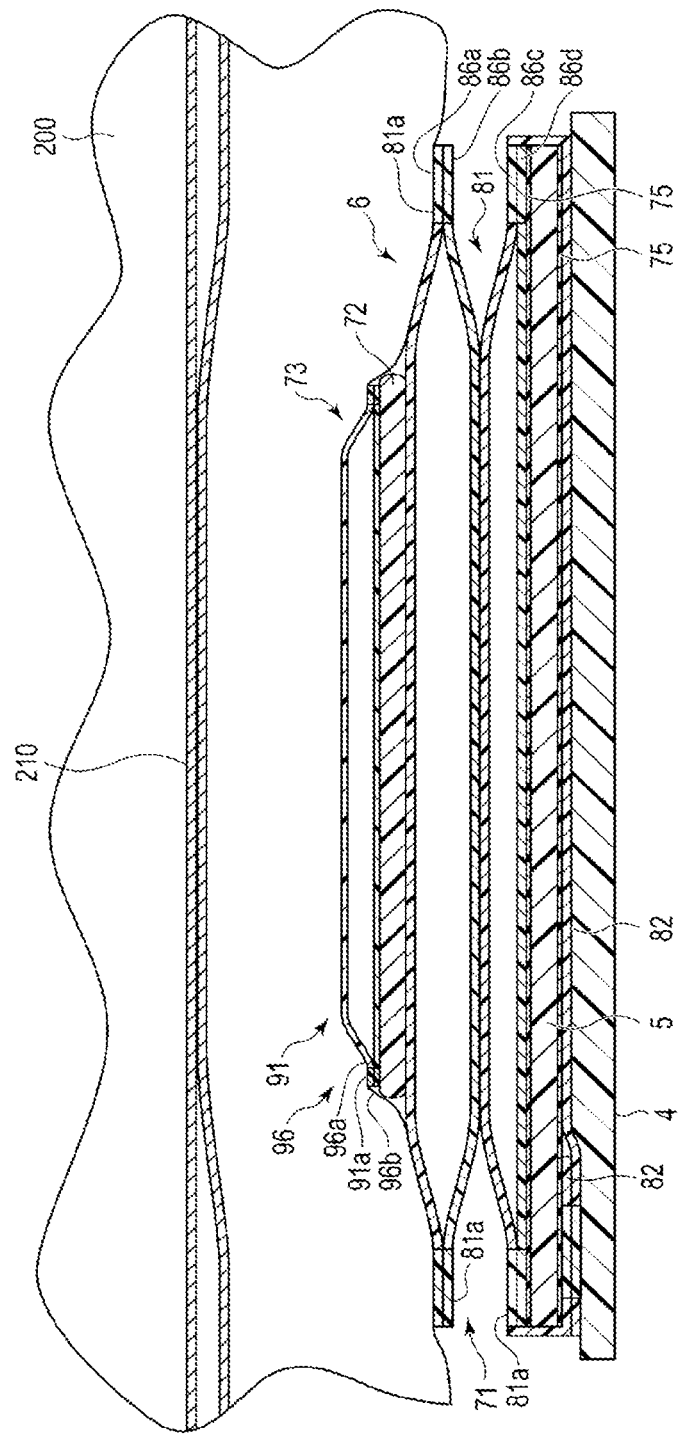
[FIG. 22]

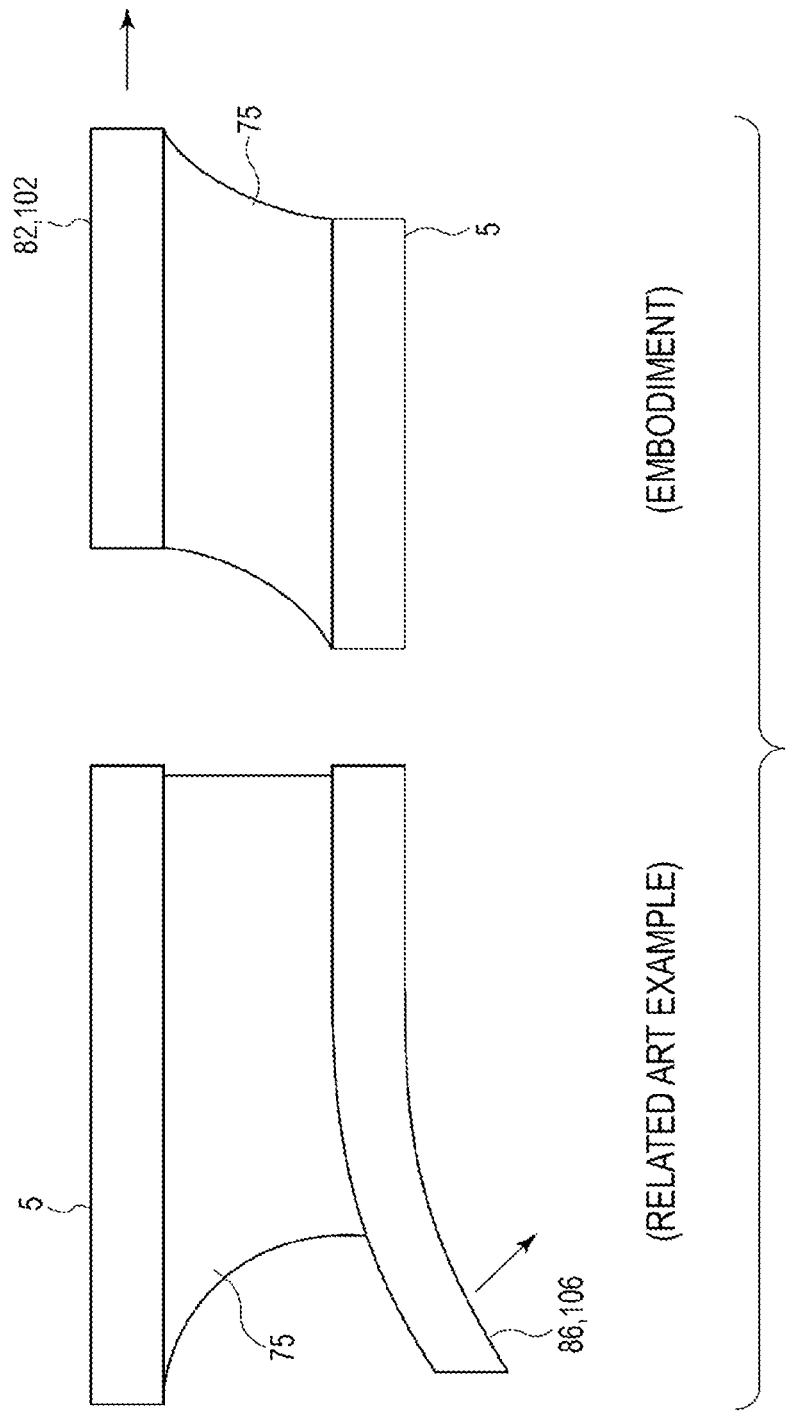

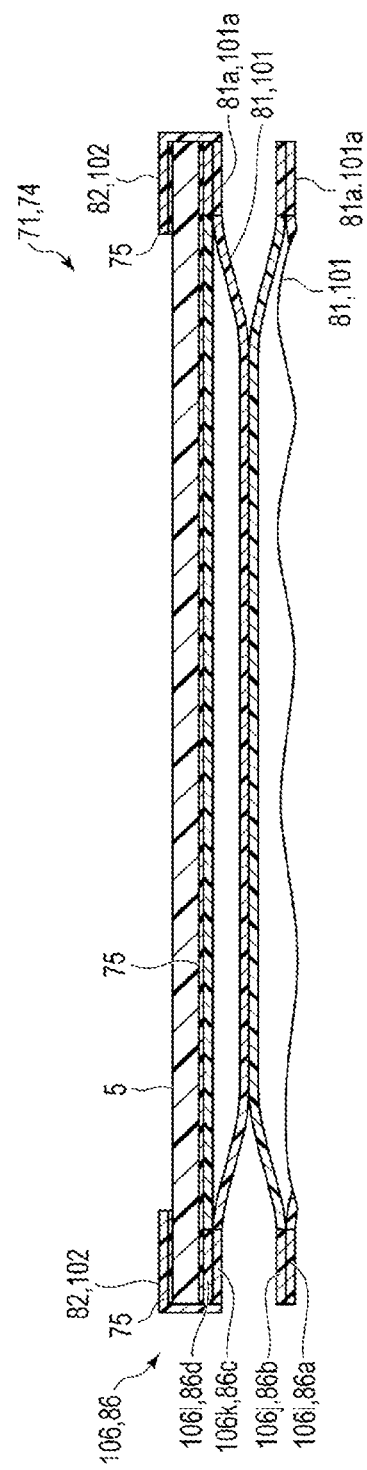
[FIG. 24]

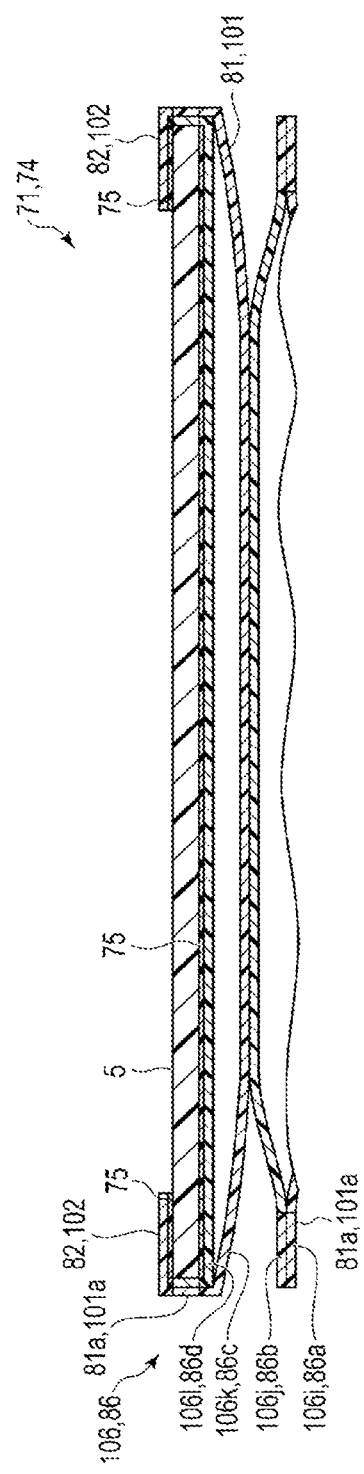
[FIG. 25]

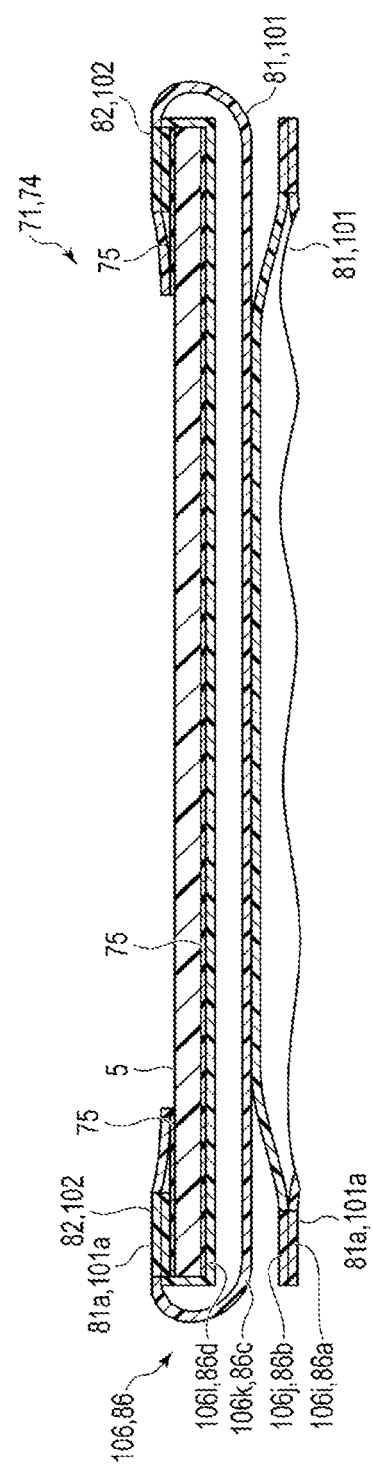
[FIG. 26]

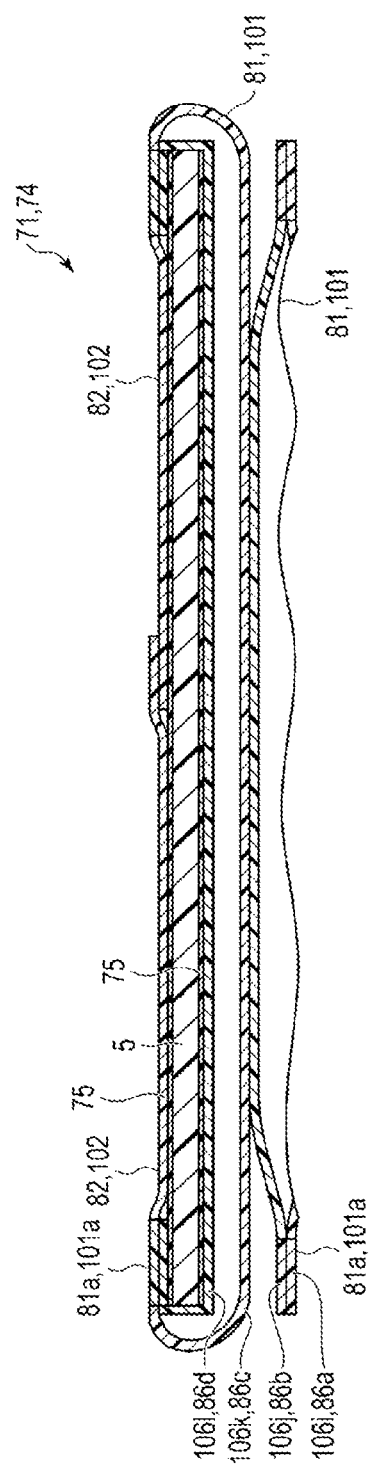

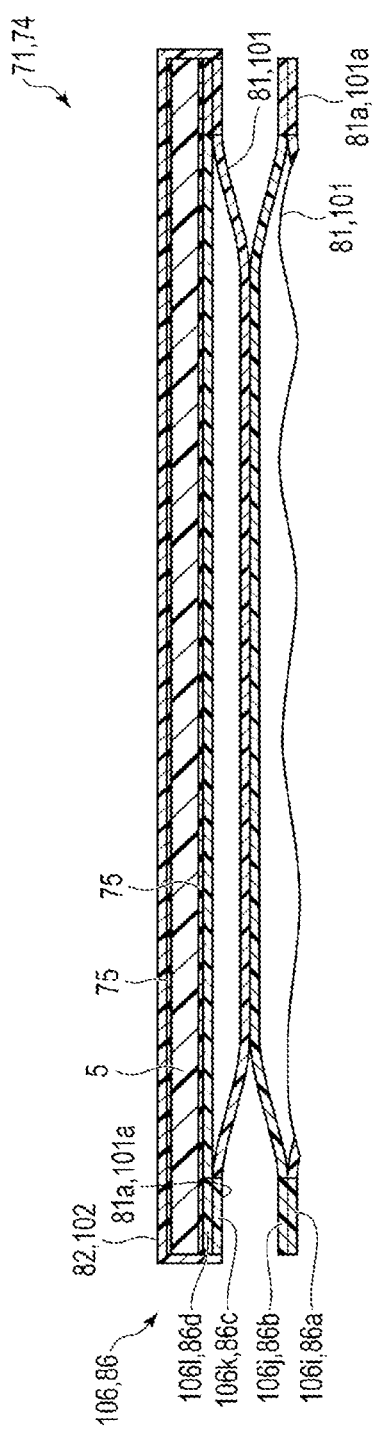

[FIG. 29]
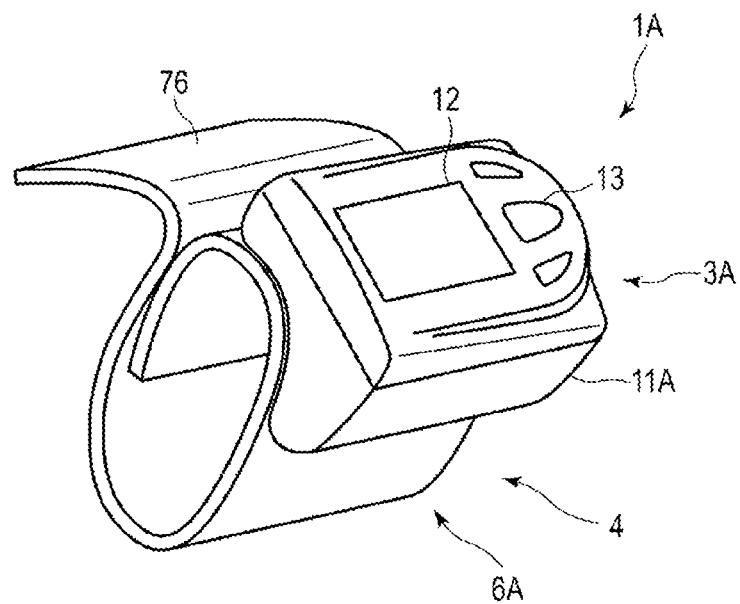
[FIG. 30]
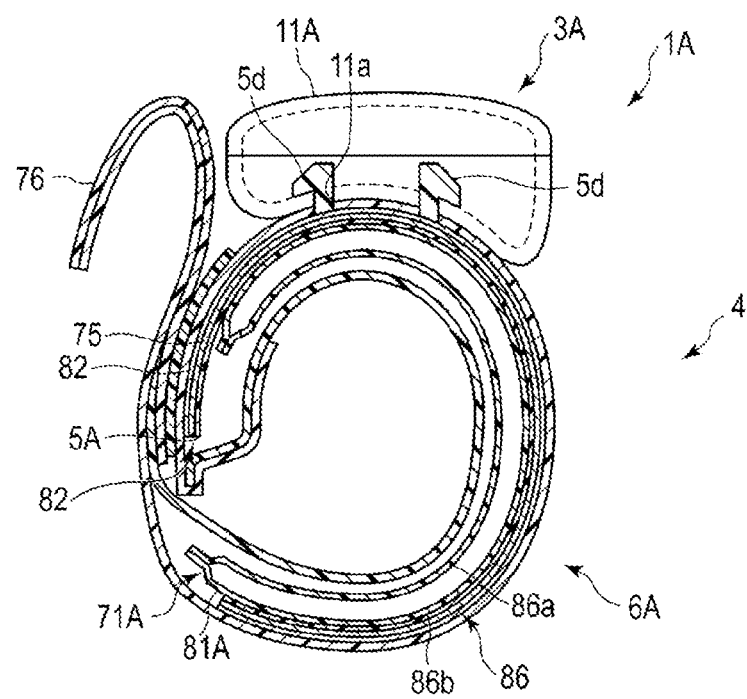

BLOOD PRESSURE MEASUREMENT DEVICE

CROSS-REFERENCE TO RELATED APPLICATIONS

This application is the U.S. national stage application filed pursuant to 35 U.S.C. §§ 365(c) and 120 as a continuation of International Patent Application No. PCT/JP2019/047164, filed Dec. 3, 2019, which application claims priority from Japanese Patent Application No. 2018-233398, filed Dec. 13, 2018, which applications are incorporated herein by reference in their entireties.

TECHNICAL FIELD

The present invention relates to a blood pressure measurement device for measuring blood pressure.

BACKGROUND ART

In recent years, blood pressure measurement devices for measuring blood pressure are being used to monitor health status at home, as well as in medical facilities. A blood pressure measurement device detects vibration of the artery wall to measure blood pressure by, for example, inflating and deflating a cuff wrapped around the upper arm or the wrist of a living body and detecting the pressure of the cuff using a pressure sensor.

As such a blood pressure measurement device, for example, a so-called integral type is known in which a cuff is integrated with a device body feeding a fluid to the cuff. Such a blood pressure measurement device is problematic in that when wrinkles, folds, and the like occur in the cuff, the accuracy of the measured blood pressure measurement results decreases. Further, the blood pressure measurement device is required to inflate the cuff in a direction that closes the blood vessel by pressure and to bring the cuff into close contact with the wrist.

Thus, as disclosed in JP 2018-102743 A, for example, there is known a technology of the blood pressure measurement device in which a curler is used between the belt and the cuff to bring the inflated cuff into close contact with the upper arm or the wrist. In such a blood pressure measurement device, the cuff is joined and fixed to the curler with a joining layer such as double-sided tape to integrate the cuff with the curler.

CITATION LIST

Patent Literature

Patent Document 1: JP 2018-102743 A

SUMMARY OF INVENTION

Technical Problem

In the blood pressure measurement device described above, when the cuff is inflated, a central side of the cuff is inflated more than an edge side. When the central side of the cuff is inflated more than an end portion side of the cuff, the stress applied to the joining layer joining the cuff to the curler is concentrated on the edge side of the cuff. Thus, stress occurs in the joining layer, causing the cuff to peel away from the curler from the edge side of the cuff. Thus, when the cuff is repeatedly inflated and deflated, there is a risk that the cuff will be peeled away from the curler. In particular, when a width of the curler and the cuff decreases, the area where the cuff and the curler are joined decreases, making the cuff more susceptible to being peeled away from the curler. Thus, it is conceivable to improve the joining strength between the curler and the cuff by increasing the width of the cuff and the curler and increasing the joining area However, a wearable blood pressure measurement device attached to the wrist has been proposed, and there has been a demand for further miniaturization. Thus, there has been a demand for a technology that can suppress the peeling of the cuff and the curler without increasing the width of the cuff and the curler.

Thus, an object of the present invention is to provide a blood pressure measurement device that can suppress peeling of a cuff and a curler.

Solution to Problem

According to one aspect, a blood pressure measurement device includes a curler that curves to follow a circumferential direction of a site of a living body where the curler is attached, and a cuff. The cuff includes a plurality of bag-like structures layered on one another, each of the plurality of bag-like structures being elongated in one direction, formed by welding two sheet members formed of a resin material, and configured to be inflated with a fluid, and a joined portion provided on at least a portion of an edge portion of the bag-like structure disposed facing the curler, the joined portion being formed by a portion of the sheet members constituting the bag-like structure disposed facing the curler and joined to an outer circumferential surface side of the curler.

Here, the fluid includes a liquid and air. The cuff refers to a member that is wrapped around the upper arm, the wrist, or the like of a living body when the blood pressure is measured and that is inflated by being fed with the fluid. The cuff includes a bag-like structure such as an air bag.

According to this aspect, the joined portion provided on at least a portion of the edge portion of the bag-like structure disposed facing the curler is joined to the outer circumferential surface side of the curler. Thus, deformation of the joined portion is suppressed even when the bag-like structure is inflated and deforms. Further, the stress that occurs between the joined portion and the outer circumferential surface of the curler due to the inflation of the bag-like structures is a shear stress. Thus, the blood pressure measurement device can suppress the peeling of the curler and the cuff during the inflation of the bag-like structures.

In the blood pressure measurement device according to the one aspect described above, the blood pressure measurement device is provided in which the joined portion is provided on each edge portion of the bag-like structure in a lateral direction.

According to this aspect, because the joined portion provided on each edge portion of the bag-like structure in a lateral direction, which is disposed facing the curler, is joined to the outer circumferential surface side of the curler, a joining area can be maintained. As a result, the blood pressure measurement device can suppress the peeling of the curler and the cuff during inflation of the bag-like structures.

In the blood pressure measurement device of the one aspect described above, the blood pressure measurement device is provided further including a joining layer provided between the joined portion and the curler and configured to join the joined portion and the curler.

According to this aspect, the joined portion and the curler are joined by the joining layer. Thus, to join the curler and the cuff, the joining layer need only be provided to a joining region of the curler and the cuff during assembly, making manufacture easy.

In the blood pressure measurement device according to the one aspect described above, the blood pressure measurement device is provided in which the joining layer is further provided between the bag-like structure and an inner circumferential surface of the curler.

According to this aspect, a configuration is adopted in which the joining layer is further provided between the bag-like structure and the inner circumferential surface of the curler. Thus, the cuff is joined to both the inner circumferential surface side and the outer circumferential surface side of the curler, making it possible to maintain the joining area to the utmost extent. As a result, the blood pressure measurement device can improve the joining strength between the cuff and the curler.

In the blood pressure measurement device according to the one aspect described above, the blood pressure measurement device is provided in which the joining layer is double-sided tape.

According to this aspect, because the cuff need only be joined to the curler with double-sided tape, ease of assembly of the cuff and the curler can be improved.

In the blood pressure measurement device according to the one aspect described above, the blood pressure measurement device is provided in which the joined portion provided at each edge portion of the bag-like structure in the lateral direction is layered on the outer circumferential surface side of the curler and integrally joined.

According to this aspect, the joined portions are joined together and thus have an integral configuration, making it possible to suppress the peeling of the joined portions away from the curler, even when an external force is applied.

In the blood pressure measurement device according to the one aspect described above, the blood pressure measurement device is provided in which the joined portions being layered are joined by welding.

According to this aspect, because the layered joined portions are integrally welded, the peeling of the joined portions away from each other can be prevented.

In the blood pressure measurement device according to the one aspect described above, the blood pressure measurement device is provided in which the bag-like structure has a width in the lateral direction greater than or equal to a width of the curler in the lateral direction.

According to this aspect, the bag-like structure has a width that is the same as or greater than the width of the curler in the lateral direction, and thus an area of the bag-like structure that can pressurize the living body can be maintained to the utmost extent, making it possible to improve a blood pressure measurement accuracy.

In the blood pressure measurement device of one aspect described above, the blood pressure measurement device is provided in which the joined portion is formed by one of the sheet members at an area facing the outer circumferential surface of the curler.

According to this aspect, because the joined portion is formed by a single sheet member at an area joined to the outer circumferential surface side of the curler, an increase in thickness of the curler and the cuff can be suppressed when the curler and the cuff are integrated.

Advantageous Effects of Invention

The present invention can provide a blood pressure measurement device that can suppress peeling of a curler and a cuff.

BRIEF DESCRIPTION OF DRAWINGS

FIG. 1 is a perspective view illustrating a configuration of a blood pressure measurement device according to a first embodiment of the present invention.

FIG. 2 is an exploded perspective view illustrating the configuration of the blood pressure measurement device.

FIG. 3 is a perspective view illustrating the configuration of the blood pressure measurement device.

FIG. 4 is an explanatory diagram illustrating a state in which the blood pressure measurement device is attached to the wrist.

FIG. 5 is a block diagram illustrating the configuration of the blood pressure measurement device.

FIG. 6 is an exploded perspective view illustrating configurations of a curler and a cuff structure of the blood pressure measurement device.

FIG. 7 is a cross-sectional view illustrating the configurations of the curler and the cuff structure of the blood pressure measurement device.

FIG. 8 is a cross-sectional view illustrating the configurations of the curler and the cuff structure of the blood pressure measurement device.

FIG. 9 is a cross-sectional view illustrating a configuration of a back-side cuff of the blood pressure measurement device.

FIG. 10 is a cross-sectional view illustrating the configuration of the back-side cuff of the blood pressure measurement device.

FIG. 11 is a perspective view illustrating the configuration of the curler of the blood pressure measurement device.

FIG. 12 is a plan view illustrating the configuration of the cuff structure of the blood pressure measurement device.

FIG. 13 is a plan view illustrating the configuration of the cuff structure.

FIG. 14 is a plan view illustrating a configuration of a palm-side cuff of the blood pressure measurement device.

FIG. 15 is a cross-sectional view illustrating the configuration of the palm-side cuff.

FIG. 16 is a plan view illustrating a configuration of a sensing cuff of the blood pressure measurement device.

FIG. 17 is a cross-sectional view illustrating the configuration of the sensing cuff of the blood pressure measurement device.

FIG. 18 is a flowchart illustrating an example of usage of the blood pressure measurement device.

FIG. 19 is a perspective view illustrating an example in which the blood pressure measurement device is attached to the wrist.

FIG. 20 is a perspective view illustrating an example in which the blood pressure measurement device is attached to the wrist.

FIG. 21 is a perspective view illustrating an example in which the blood pressure measurement device is attached to the wrist.

FIG. 22 is a cross-sectional view schematically illustrating a state in which the blood pressure measurement device is attached to a living body.

FIG. 23 is an explanatory diagram illustrating a stress applied to the cuff of the blood pressure measurement device in comparison to that in a related art example.

FIG. 24 is a cross-sectional view illustrating configurations of other modified examples of the back-side cuff and the palm-side cuff of the blood pressure measurement device.

FIG. 25 is a cross-sectional view illustrating configurations of other modified examples of the back-side cuff and the palm-side cuff of the blood pressure measurement device.

FIG. 26 is a cross-sectional view illustrating configurations of other modified examples of the back-side cuff and the palm-side cuff of the blood pressure measurement device.

FIG. 27 is a cross-sectional view illustrating configurations of other modified examples of the back-side cuff and the palm-side cuff of the blood pressure measurement device.

FIG. 28 is a cross-sectional view illustrating configurations of other modified examples of the back-side cuff and the palm-side cuff of the blood pressure measurement device.

FIG. 29 is a perspective view illustrating a configuration of a blood pressure measurement device according to a second embodiment of the present invention.

FIG. 30 is a cross-sectional view illustrating the configuration of the blood pressure measurement device.

DESCRIPTION OF EMBODIMENTS

First Embodiment

An example of a blood pressure measurement device 1 according to a first embodiment of the present invention will be described below with reference to FIG. 1 to FIG. 17.

FIG. 1 is a perspective view illustrating a configuration of the blood pressure measurement device 1 according to the first embodiment of the present invention. FIG. 2 is an exploded perspective view illustrating the configuration of the blood pressure measurement device 1. FIG. 3 is a perspective view illustrating the configuration of the blood pressure measurement device 1. FIG. 4 is an explanatory diagram illustrating a state in which the blood pressure measurement device 1 is attached to a wrist 200. FIG. 5 is a block diagram illustrating the configuration of the blood pressure measurement device 1. FIG. 6 is an exploded perspective view illustrating configurations of a curler 5 and a cuff structure 6 of the blood pressure measurement device 1. FIG. 7 is a cross-sectional view illustrating the configurations of the curler 5 and the cuff structure 6 of the blood pressure measurement device 1. FIG. 8 is a cross-sectional view illustrating the configurations of the curler 5 and the cuff structure 6 of the blood pressure measurement device 1. FIG. 9 is a cross-sectional view illustrating a configuration of a back-side cuff 74 of the blood pressure measurement device 1. FIG. 10 is a cross-sectional view illustrating the configuration of the back-side cuff 74 of the blood pressure measurement device 1. FIG. 11 is a perspective view illustrating the configuration of the curler 5 of the blood pressure measurement device 1. FIG. 12 is a plan view illustrating the configuration of the cuff structure 6 of the blood pressure measurement device 1 on a living body side. FIG. 13 is a plan view illustrating the configuration of the cuff structure 6 as viewed from an inner circumferential surface side of the curler 5.

FIG. 14 is a plan view illustrating a configuration of a palm-side cuff 71 of the blood pressure measurement device 1. FIG. 15 is a cross-sectional view illustrating the configuration of the palm-side cuff 71 at a cross section taken along line XV-XV in FIG. 14. FIG. 16 is a plan view illustrating a configuration of a sensing cuff 73 of the blood pressure measurement device 1. FIG. 17 is a cross-sectional view of the configuration of the sensing cuff 73 of the blood pressure measurement device 1 at a cross section taken along line XVII-XVII in FIG. 16.

The blood pressure measurement device 1 is an electronic blood pressure measurement device attached to a living body. The present embodiment will be described using an electronic blood pressure measurement device having an aspect of a wearable device attached to the wrist 200 of the living body.

As illustrated in FIG. 1 to FIG. 3, the blood pressure measurement device 1 includes a device body 3, a belt 4 that fixes the device body 3 at the wrist, the curler 5 disposed between the belt 4 and the wrist, the cuff structure 6 including the palm-side cuff 71, the sensing cuff 73, and the back-side cuff 74, a fluid circuit 7 fluidly connecting the device body 3 and the cuff structure 6, and a power supply unit 8 provided to the curler 5.

As illustrated in FIGS. 1 to 5, the device body 3 includes, for example, a case 11, a display unit 12, an operation unit 13, a pump 14, a flow path unit 15, an on-off valve 16, a pressure sensor 17, a power supply unit 18, a vibration motor 19, and a control substrate 20. The device body 3 feeds a fluid to the cuff structure 6 using the pump 14, the on-off valve 16, the pressure sensor 17, the control substrate 20, and the like.

As illustrated in FIG. 1 to FIG. 3, the case 11 includes an outer case 31, a windshield 32 that covers an upper opening of the outer case 31, a base portion 33 provided at a lower portion of an interior of the outer case 31, and a back cover 35 covering a lower portion of the outer case 31.

The outer case 31 is formed in a cylindrical shape. The outer case 31 includes pairs of lugs 31a provided at circumferentially symmetrical positions on the outer circumferential surface, and spring rods 31b each provided between corresponding lugs 31 of the two pairs of lugs 31a. The windshield 32 is, for example, a circular glass plate.

The base portion 33 holds the display unit 12, the operation unit 13, the pump 14, the on-off valve 16, the pressure sensor 17, the power supply unit 18, the vibration motor 19, and the control substrate 20. Additionally, the base portion 33 constitutes, for example, a portion of the flow path unit 15 that makes the pump 14 and the cuff structure 6 fluidly continuous.

The back cover 35 is constituted in an annular shape in which a central side is open. The back cover 35 covers an outer circumferential edge side of an end portion of the outer case 31 on the living body side. Such a back cover 35 is integrally combined with the curler 5 so that the central opening is covered by the curler 5, and, together with the curler 5, constitutes a back lid that covers the end portion of the outer case 31 on the living body side. The back cover 35 is fixed to the end portion of the outer case 31 on the living body side or to the base portion 33 using, for example, four screws 35a.

The display unit 12 is disposed above the base portion 33 of the outer case 31 and directly below the windshield 32. As illustrated in FIG. 5, the display unit 12 is electrically connected to the control substrate 20. The display unit 12 is, for example, a liquid crystal display or an organic electroluminescence display. The display unit 12 displays various types of information including the date and time and measurement results of blood pressure values such as the systolic blood pressure and diastolic blood pressure, heart rate, and the like.

The operation unit 13 is configured to be capable of receiving an instruction input from a user. For example, the operation unit 13 includes a plurality of buttons 41 provided on the case 11, a sensor 42 that detects operation of the buttons 41, and a touch panel 43 provided on the display unit 12 or the windshield 32, as illustrated in FIG. 5. When operated by the user, the operation unit 13 converts an instruction into an electrical signal. The sensor 42 and the touch panel 43 are electrically connected to the control substrate 20 and output electrical signals to the control substrate 20.

As the plurality of buttons 41, for example, three buttons are provided. The buttons 41 are supported by the base portion 33 and protrude from the outer circumferential surface of the outer case 31. The plurality of buttons 41 and a plurality of the sensors 42 are supported by the base portion 33. The touch panel 43 is integrally provided on the windshield 32, for example.

The pump 14 is, for example, a piezoelectric pump. The pump 14 compresses air and feeds the compressed air to the cuff structure 6 through the flow path unit 15. The pump 14 is electrically connected to the control substrate 20.

The flow path unit 15 constitutes a flow path connecting from the pump 14 to the palm-side cuff 71 and the back-side cuff 74 and a flow path connecting from the pump 14 to the sensing cuff 73, as illustrated in FIG. 5. Additionally, the flow path unit 15 constitutes a flow path connecting from the palm-side cuff 71 and the back-side cuff 74 to the atmosphere, and a flow path connecting from the sensing cuff 73 to the atmosphere. The flow path unit 15 is a flow path of air constituted by a hollow portion, a groove, a tube, and the like provided in the base portion 33 and the like.

The on-off valve 16 opens and closes a portion of the flow path unit 15. A plurality of the on-off valves 16 are provided, for example, as illustrated in FIG. 5, and selectively opens and closes the flow path connecting from the pump 14 to the palm-side cuff 71 and the back-side cuff 74, the flow path connecting from the pump 14 to the sensing cuff 73, the flow path connecting from the palm-side cuff 71 and the back-side cuff 74 to the atmosphere, and the flow path connecting from the sensing cuff 73 to the atmosphere, by the combination of opening and closing of each of the on-off valves 16. For example, two on-off valves 16 are used.

The pressure sensor 17 detects the pressures in the palm-side cuff 71, the sensing cuff 73 and the back-side cuff 74. The pressure sensor 17 is electrically connected to the control substrate 20. The pressure sensor 17 converts a detected pressure into an electrical signal, and outputs the electrical signal to the control substrate 20. The pressure sensor 17 is provided in each of the flow path connecting from the pump 14 to the palm-side cuff 71 and the back-side cuff 74 and the flow path connecting from the pump 14 to the sensing cuff 73, as illustrated in FIG. 5. These flow paths are continuous to the palm-side cuff 71, the sensing cuff 73, and the back-side cuff 74, and thus the pressure in these flow paths are equal to the pressure in the internal space of the palm-side cuff 71, the sensing cuff 73, and the back-side cuff 74.

The power supply unit 18 is, for example, a secondary battery such as a lithium ion battery. The power supply unit 18 is electrically connected to the control substrate 20 as illustrated in FIG. 5. The power supply unit 18 supplies power to the control substrate 20.

As illustrated in FIG. 5, the control substrate 20 includes, for example, a substrate 51, an acceleration sensor 52, a communication unit 53, a storage unit 54, and a control unit 55. The control substrate 20 is constituted by the acceleration sensor 52, the communication unit 53, the storage unit 54, and the control unit 55 that are mounted on the substrate 51.

The substrate 51 is fixed to the base portion 33 of the case 11 using screws or the like.

The acceleration sensor 52 is, for example, a 3-axis acceleration sensor. The acceleration sensor 52 outputs, to the control unit 55, an acceleration signal representing acceleration of the device body 3 in three directions orthogonal to one another. For example, the acceleration sensor 52 is used to measure, from the detected acceleration, the amount of activity of the living body to which the blood pressure measurement device 1 is attached.

The communication unit 53 is configured to be able to transmit and receive information to and from an external device wirelessly or by wire. For example, the communication unit 53 transmits, to an external device via a network, information controlled by the control unit 55, and information of a measured blood pressure value, a pulse, and the like, receives a program or the like for software update from an external device via a network and sends the program or the like to the control unit 55.

In the present embodiment, the network is, for example, the Internet, but is not limited to this. The network may be a network such as a Local Area Network (LAN) provided in a hospital or may be direct communication with an external device using a cable or the like including a terminal of a predetermined standard such as a USB. Thus, the communication unit 53 may be configured to include a plurality of wireless antennas, micro-USB connectors, and the like.

The storage unit 54 pre-stores program data for controlling the overall blood pressure measurement device 1 and the fluid circuit 7, setting data for setting various functions of the blood pressure measurement device 1, calculation data for calculating a blood pressure value and a pulse from pressure measured by the pressure sensors 17, and the like. Additionally, the storage unit 54 stores information such as a measured blood pressure value and a measured pulse.

The control unit 55 is constituted by one or more CPUs, and controls operation of the overall blood pressure measurement device 1 and operation of the fluid circuit 7. The control unit 55 is electrically connected to and supplies power to the display unit 12, the operation unit 13, the pump 14, the on-off valves 16, and the pressure sensors 17. Additionally, the control unit 55 controls operation of the display unit 12, the pump 14, and the on-off valves 16, based on electrical signals output by the operation unit 13 and the pressure sensors 17.

For example, as illustrated in FIG. 5, the control unit 55 includes a main Central Processing Unit (CPU) 56 that controls operation of the overall blood pressure measurement device 1, and a sub-CPU 57 that controls operation of the fluid circuit 7. For example, the main CPU 56 obtains measurement results such as blood pressure values, for example, the systolic blood pressure and the diastolic blood pressure, and the heart rate, from electrical signals output by the pressure sensors 17, and outputs an image signal corresponding to the measurement results to the display unit 12.

For example, the sub-CPU 57 drives the pump 14 and the on-off valves 16 to feed compressed air to the palm-side cuff 71 and the sensing cuff 73 when an instruction to measure the blood pressure is input from the operation unit 13. In addition, the sub-CPU 57 controls driving and stopping of the pump 14 and opening and closing of the on-off valves 16 based on electrical signals output by the pressure sensors 17. The sub-CPU 57 controls the pump 14 and the on-off valves 16 to selectively feed compressed air to the palm-side cuff 71 and the sensing cuff 73 and selectively depressurize the palm-side cuff 71 and the sensing cuff 73.

As illustrated in FIG. 1 to FIG. 4, the belt 4 includes a first belt 61 provided at a first pair of lugs 31a and a first spring rod 31b, and a second belt 62 provided at a second pair of lugs 31a and a second spring rod 31b. The belt 4 is wrapped around the wrist 200 with the curler 5 interposed therebetween.

The first belt 61 is referred to as a so-called a parent and is constituted in a band-like shape that can be coupled with the second belt 62. The first belt 61 includes a belt portion 61a and a buckle 61b, as illustrated in FIG. 1 and FIG. 2. The belt portion 61a is formed in a band-like shape. The belt portion 61a is formed from an elastically deformable resin material. Further, the belt portion 61a includes therein a sheet-like insert member that is flexible and suppresses expansion and contraction of the belt portion 61a in a longitudinal direction. The belt portion 61a includes a first hole portion 61c formed at a first end portion and extending orthogonally to the longitudinal direction of the belt portion 61a, and a second hole portion 61d formed at a second end portion and extending orthogonally to the longitudinal direction of the first belt 61.

As illustrated in FIG. 1 and FIG. 2, the first hole portion 61c is provided at the end portion of the belt portion 61a. The first hole portion 61c has an inner diameter that allow the spring rod 31b to be inserted into the first hole portion 61c and first belt 61 to rotate with respect to the spring rod 31b. In other words, the first belt 61 is rotatably held by the outer case 31 by disposing the first hole portion 61c between the pair of lugs 31a and around the spring rod 31b.

As illustrated in FIG. 1 and FIG. 2, the second hole portion 61d is provided at a distal end of the belt portion 61a. The buckle 61b is attached to the second hole portion 61d.

As illustrated in FIG. 1 and FIG. 2, the buckle 61b includes a frame body 61e having a rectangular frame shape and a prong 61f rotatably attached to the frame body 61e. A side of the frame body 61e to which the prong 61f is attached is inserted into the second hole portion 61d, and the frame body 61e is attached rotatably with respect to the belt portion 61a.

The second belt 62 is referred to as a so-called pointed end, and is constituted in a band-like shape having a width that allows the second belt 62 to be inserted into the frame body 61e. The second belt 62 is formed from an elastically deformable resin material. Further, the second belt 62 includes a sheet-like insert member that is flexible and suppresses expansion and contraction of the second belt 62 in the longitudinal direction.

Further, the second belt 62, as illustrated in FIG. 1 to FIG. 3, includes a plurality of small holes 62a into which the prong 61f is inserted. Additionally, the second belt 62 includes a third hole portion 62b provided at a first end portion of the second belt 62 and extending orthogonally to the longitudinal direction of the second belt 62. The third hole portion 62b has an inner diameter that allows the spring rod 31b to be inserted into the third hole portion 62b and the second belt 62 to rotate with respect to the spring rod 31b. In other words, the second belt 62 is rotatably held by the outer case 31 by disposing the third hole portion 62b between the pair of lugs 31a and around the spring rod 31b.

The second belt 62 of the belt 4 as described above is inserted into the frame body 61e, and the prong 61f is inserted into the small hole 62a. Thus, the first belt 61 and the second belt 62 are integrally connected together, and the belt 4, together with the outer case 31, has an annular shape following the circumferential direction of the wrist 200.

With the belt 4 formed in an annular shape following the circumferential direction of the wrist 200, the belt 4 presses and elastically deforms the curler 5, causing the curler 5 to follow the circumferential direction of the wrist of the wearer of the blood pressure measurement device 1.

As illustrated in FIG. 1 to FIG. 4, the curler 5 is constituted in a band-like shape that curves to follow the circumferential direction of the wrist. The curler 5 is formed with a first end and a second end spaced apart from each other. For example, a first end-side outer surface of the curler 5 is fixed to the back cover 35 of the device body 3. The curler 5 is disposed in a position in which the first end and the second end protrude relative to the back cover 35. Furthermore, the first end and the second end of the curler 5 are located adjacent to each other at a predetermined distance from each other. The curler 5 is formed of a resin material, for example. As a specific example, the curler 5 is formed of polypropylene to a thickness of approximately 1 mm.

As a specific example, as illustrated in FIG. 4, the curler 5 is constituted in a band-like shape that curves to follow the circumferential direction of the wrist, and includes a disc-shaped cover portion 5a that, together with the back cover 35, constitute a back lid at a position on the end side facing a hand back side of the wrist 200. In the curler 5, for example, the cover portion 5a and areas adjacent thereto are formed in flat plate shapes, and the first end side and the second end side of the curler 5 that are more distal than the cover portion 5a are formed to curve at a predetermined curvature.

Further, as illustrated in FIG. 11, the curler 5 is formed in a shape in which the second end is positioned on the inner circumferential surface side of the first end side when the first end and the second end are in close proximity. As a specific example, a width of the curler 5 in a width direction of the wrist 200 is set greater on the hand back side of the wrist 200 than on the palm side of the wrist 200. Then, in the curler 5, a radius of curvature of the first end on the hand back side of the wrist 200 is set greater than a radius of curvature of the second end on the palm side of the wrist 200. According to such a configuration, when both end sides of the curler 5 come into contact with each other, the second end of the curler 5 is disposed further inward of the curler 5 than the first end.

The cover portion 5a includes an insert member for reinforcement. The cover portion 5a includes a screw hole 5b to which the back cover 35 is attached using the screw 35a or the like. Further, the cover portion 5a includes a hole portion 5c for connecting the cuff structure 6 to the device body 3. In the present embodiment, three hole portions 5c are provided in the cover portion 5a, each formed to a diameter that allows connection portions 84, 93, and 103 described later of the palm-side cuff 71, the sensing cuff 73, and the back-side cuff 74 to be inserted. The cover portion 5a is secured to the living body side of outer case 31 via the fixed back cover 35.

Such a curler 5 is fixed to the outer case 31 with both the first end and the second end facing the second belt 62 of the belt 4. Further, at least at a position facing the palm side of the wrist 200, the curler 5 curves to follow the circumferential direction on the palm side of the wrist 200, thereby holding the cuff structure 6 facing the palm side of the wrist 200 in a state of being curved to follow the shape of the palm side of the wrist 200.

Further, the curler 5 has a hardness with flexibility and shape retainability. Here, "flexibility" means that the shape of the curler 5 deforms in a radial direction when an external force of the belt 4 is applied to the curler 5. For example, "flexibility" means that the shape of the curler 5 deforms in a side view when the curler 5 is pressed by the belt 4 such that the curler 5 approaches the wrist, is along the shape of the wrist, or follows the shape of the wrist. Furthermore, "shape retainability" refers to the ability of the curler 5 to maintain a pre-formed shape when no external force is applied to the curler 5. For example, "shape retainability" in the present embodiment means that the shape of the curler 5 curving along the circumferential direction of the wrist can be maintained.

The cuff structure 6 is disposed on the inner circumferential surface of the curler 5, and is held along the shape of the inner circumferential surface of the curler 5. As a specific example, the palm-side cuff 71 and the back-side cuff 74 are disposed on the inner circumferential surface of the curler 5, and the cuff structure 6 is fixed to the curler 5 by a joining layer 75 provided between the curler 5 and both the palm-side cuff 71 and the back-side cuff 74. In the present embodiment, the joining layer 75 is an adhesive or double-sided tape.

The curler 5 is formed of a resin material. For example, the curler 5 is formed of polypropylene to a thickness of approximately 1 mm.

As illustrated in FIG. 1 to FIG. 6, FIG. 12, and FIG. 13, the cuff structure 6 includes the palm-side cuff (cuff) 71, a back plate 72, the sensing cuff 73, and the back-side cuff (cuff) 74. Further, the cuff structure 6 includes the joining layer 75 joining the respective configurations as well as the curler 5 and the cuffs 71 and 74. The cuff structure 6 is fixed to the curler 5. In the cuff structure 6, the palm-side cuff 71, the back plate 72, and the sensing cuff 73 are stacked on one another and disposed on the curler 5, and the back-side cuff 74 is spaced apart from the palm-side cuff 71, the back plate 72, and the sensing cuff 73 and disposed on the curler 5.

As a specific example, the cuff structure 6 is, as illustrated in FIG. 4, fixed to the inner circumferential surface of the curler 5 on the palm side of the wrist 200 with the palm-side cuff 71, the back plate 72, and the sensing cuff 73 stacked in this order from the inner circumferential surface of the curler 5 toward the living body side. Further, in the cuff structure 6, the back-side cuff 74 is disposed on the inner circumferential surface of the curler 5 on the hand back side of the wrist 200. Each of the members of the cuff structure 6 is fixed to an adjacent member of the cuff structure 6 in a stacking direction with the joining layer 75.

The palm-side cuff 71 is a so-called pressing cuff. The palm-side cuff 71 is fluidly connected to the pump 14 through the flow path unit 15. The palm-side cuff 71 is inflated to press the back plate 72 and the sensing cuff 73 toward the living body side. The palm-side cuff 71, as illustrated in FIG. 6 to FIG. 8 and FIG. 12 to FIG. 15, includes air bags 81 including a plurality of layers, for example, two layers, a joined portion 82 provided to the air bag 81 facing the curler 5, a tube 83 in communication with the air bags 81, and a connection portion 84 provided at a distal end of the tube 83. Such a palm-side cuff 71 is formed by integrally welding a plurality of sheet members 86.

Here, the air bags 81 are bag-like structures, and in the present embodiment, the blood pressure measurement device 1 is configured to use air with the pump 14, and thus the present embodiment will be described using the air bags. However, in a case where a fluid other than air is used, the bag-like structures may be fluid bags such as liquid bags. The plurality of air bags 81 are stacked and are in fluid communication with one another in the stacking direction.

Each of the air bags 81 is formed in a rectangular bag shape elongated in one direction. Further, a width of the air bag 81 in a lateral direction is set to be the same as a width of the curler 5 in the lateral direction. The air bag 81 is formed by, for example, combining two sheet members 86 and thermally welding the sheet members 86 in a rectangular frame shape elongated in one direction, as illustrated by a welded portion 81a in FIG. 7, FIG. 8, and FIG. 12 to FIG. 15. Further, the two-layer air bag 81 is formed by thermally welding and thus integrally combining two air bags 81, or by welding, to each other, the sheet members 86 of adjacent air bags 81 facing each other and then welding the air bags 81. The two-layer air bag 81 is fluidly continuous via openings provided in the sheet members 86 facing each other.

One or a plurality of the joined portions 82 are provided on at least a portion of an edge portion of the air bag 81 disposed adjacent to the curler 5. The joined portion 82 is formed by a portion of the sheet members 86 constituting the air bag 81.

In the present embodiment, description is made using an example in which one joined portion 82 is provided to each of the edge portions of the air bag 81 in the lateral direction, as illustrated in FIG. 6 to FIG. 8 and FIG. 12 to FIG. 15. Note that, for example, the joined portion 82 may be divided in the longitudinal direction of the air bag 81 by a slit, or a plurality of the joined portions 82 may be provided in the longitudinal direction of the air bag 81. The joined portion 82 is joined to at least an outer circumferential surface of the curler 5 when the palm-side cuff 71 is disposed on the inner circumferential surface of the curler 5. Further, for example, two joined portions 82 are layered and then welded.

Note that the lengths of the two joined portions 82 in the lateral direction of the air bag 81 are set to be different, for example. In this example, the two joined portions 82 are layered and welded on the curler 5 on the first end side in the lateral direction. Note that, as long as the distal ends of the two joined portions 82 can be disposed on the outer circumferential surface of the curler 5, the two joined portions 82 may be set to appropriate lengths and it does not matter whether the joined portions 82 can or cannot be layered. When the joined portions 82 are set to be capable of being layered, the lengths are preferably set such that the distal ends do not extend outward of the outer edge of the outer circumferential surface of the curler 5.

The tube 83 is integrally provided to one of the air bags 81, for example, to a portion of one longitudinal edge portion of the air bag 81 adjacent to the curler 5, as illustrated in FIG. 6 and FIG. 12 to FIG. 15. As a specific example, the tube 83 is provided at an end portion of the air bag 81 near the device body 3. Further, the tube 83 is formed in a shape elongated in one direction and having a width smaller than the width of the air bag 81 in the lateral direction, and a distal end of the tube 83 is formed in a circular shape. The tube 83 includes the connection portion 84 at the distal end. The tube 83 is connected to the flow path unit 15 via the connection portion 84 and constitutes a flow path between the device body 3 and the air bag 81.

With the connection portion 84 disposed on two sheet members 86, a portion of the sheet members 86 adjacent to a region of the sheet members 86 constituting the air bag 81 is thermally welded in a frame shape elongated in one direction, so that the tube 83 is formed.

Note that the air bag 81 provided with the tube 83 is configured so that a portion of the welded portion 81a for welding the two sheet members 86 in a rectangular frame shape is not welded and is continuous with a welded portion 83a constituting the tube 83, thereby making the air bag 81 and the tube 83 fluidly continuous.

The connection portion 84 is, for example, a nipple. The connection portion 84 is provided at the distal end of the tube 83. A distal end of the connection portion 84 is exposed from the sheet member 86 facing the curler 5, which is one of the two sheet members 86 constituting the tube 83.

As a specific example, as illustrated in FIG. 7 and FIG. 8, the palm-side cuff 71 includes a first sheet member 86a, a second sheet member 86b, a third sheet member 86c, and a fourth sheet member 86d in this order from the living body side. The second sheet member 86b constitutes a first-layer air bag 81 along with the first sheet member 86a. The third sheet member 86c is integrally joined to the second sheet member 86b and constitutes the joined portions 82. The fourth sheet member 86d constitutes a second-layer air bag 81 and the tube 83 along with the third sheet member 86c. Note that the palm-side cuff 71 is integrally formed by joining the sheet members 86 adjacent to each other by thermal welding.

The first sheet member 86a and the second sheet member 86b are constituted in the same rectangular shape as the air bag 81, and edge portions of four sides thereof are welded to form the air bag 81. The second sheet member 86b and the third sheet member 86c are disposed facing each other, and include a plurality of openings 86b1 and 86c1 through which the two air bags 81 are fluidly continuous. Further, a periphery of the plurality of openings 86b1 and 86c1 is thermally welded in a four-sided frame shape smaller than that of the four sides by which the air bag 81 is welded, thereby the second sheet member 86b and the third sheet member 86c are integrally joined.

The third sheet member 86c is constituted in a shape capable of constituting the air bag 81, the joined portions 82, and the tube 83, for example. The fourth sheet member 86d is constituted in a shape capable of constituting the air bag 81 and the tube 83, for example. Further, the fourth sheet member 86d includes a hole portion 86d1 into which the distal end of the connection portion 84 can be inserted, for example.

The third sheet member 86c and the fourth sheet member 86d are disposed facing each other, thermally welded along the edge shapes of the air bag 81 and the tube 83 so that the air bag 81 and the tube 83 are fluidly continuous, and cut into predetermined shapes, thereby constituting the air bag 81, the joined portions 82, and the tube 83.

In the fourth sheet member 86d, the connection portion 84 is disposed in the hole portion 86d1, and a periphery of the hole portion 86d1 is thermally welded to the connection portion 84. Furthermore, the fourth sheet member 86d is joined to the inner circumferential surface of the curler 5 via the joining layer 75, and the joined portions 82 of the third sheet member 86c are joined to the outer circumferential surface of the curler 5 via the joining layer 75.

The back plate 72, as illustrated in FIG. 7 and FIG. 8, is applied to an outer surface of the first sheet member 86a of the palm-side cuff 71 with the joining layer 75. The back plate 72 is formed in a plate shape using a resin material. The back plate 72 is made of polypropylene, for example, and is formed in a plate shape having a thickness of approximately 1 mm. The back plate 72 has shape followability.

Here, "shape followability" refers to a function in which the backplate 72 can be deformed in such a manner as to follow the shape of a contacted portion of the wrist 200 to be disposed. This contacted portion of the wrist 200 refers to a region of the wrist 200 that faces the back plate 72. This contact includes both direct contact and indirect contact via the sensing cuff 73.

For example, as illustrated in FIG. 8, the back plate 72 includes a plurality of grooves 72a formed in both main surfaces of the back plate 72 and extending in a direction orthogonal to the longitudinal direction. As illustrated in FIG. 8, a plurality of the grooves 72a are provided in both main surfaces of the back plate 72. The plurality of grooves 72a provided in one of the main surfaces face the corresponding grooves 72a provided in the other main surface in the thickness direction of the back plate 72. Additionally, the plurality of grooves 72a are disposed at equal intervals in the longitudinal direction of the back plate 72.

In the back plate 72, portions including the plurality of grooves 72a are thinner than portions including no grooves 72a and thus the portions including the plurality of grooves 72a are easily deformed. Accordingly, the back plate 72 is deformed in such a manner as to follow the shape of the wrist 200, and has shape followability of extending in the circumferential direction of the wrist. The back plate 72 is formed such that the length of the back plate 72 is sufficient to cover the palm side of the wrist 200. The back plate 72 transfers the pressing force from the palm-side cuff 71 to the back plate 72 side main surface of the sensing cuff 73 in a state in which the back plate 72 is extending along the shape of the wrist 200.

The sensing cuff 73 is fluidly connected to the pump 14 via the flow path unit 15. The sensing cuff 73 is fixed to the living body side main surface of the back plate 72. The sensing cuff 73 is in direct contact with a region of the wrist 200 where an artery 210 resides, as illustrated in FIG. 4 and FIG. 22. Examples of the artery 210 used herein include a radial artery and an ulnar artery. The sensing cuff 73 is formed in the same shape as that of the back plate 72 or a shape that is smaller than that of the back plate 72, in the longitudinal direction and the width direction of the back plate 72. The sensing cuff 73 is inflated to compress a palm-side region of the wrist 200 in which the artery 210 resides. The sensing cuff 73 is pressed by the inflated palm-side cuff 71 toward the living body side with the back plate 72 in between.

As a specific example, the sensing cuff 73 includes, as illustrated in FIG. 7, FIG. 8, FIG. 16, and FIG. 17, one air bag 91, a tube 92 that communicates with the air bag 91, and the connection portion 93 provided at a distal end of the tube 92. One main surface of the air bag 91 of the sensing cuff 73 is fixed to the back plate 72. For example, the sensing cuff 73 is joined to the living body side main surface of the back plate 72 by the joining layer 75. Such a sensing cuff 73 is formed by integrally welding two sheet members 96.

Here, the air bag 91 is a bag-like structure, and in the present embodiment, the blood pressure measurement device 1 is configured to use air with the pump 14, and thus the present embodiment will be described using the air bag. However, in a case where a fluid other than air is used, the bag-like structure may be a liquid bag and the like.

The air bag 91 is constituted in a rectangular shape elongated in one direction. The air bag 91 is formed by, for example, combining two sheet members 96 elongated in one direction and thermally welding the sheet members 96 in a rectangular frame shape elongated in one direction, as illustrated by a welded portion 91a in FIG. 7, FIG. 8, FIG. 12, FIG. 13, FIG. 16, and FIG. 17.

The tube 92 is integrally provided at a portion of one longitudinal edge portion of the air bag 91. As a specific example, the tube 92 is provided at an end portion of the air bag 91 near the device body 3. Further, the tube 92 is formed in a shape elongated in one direction with a width smaller than a width of the air bag 91 in the lateral direction, and the distal end of the tube 92 is formed in a circular shape. The tube 92 includes the connection portion 93 at the distal end. The tube 92 is connected to the flow path unit 15 via the connection portion 93 and constitutes a flow path between the device body 3 and the air bag 91.

With the connection portion 93 disposed on two sheet members 96, a portion of the sheet members 96 adjacent to a region of the sheet members 96 constituting the air bag 91 is thermally welded in a frame shape elongated in one direction, so that the tube 92 is formed. Note that the air bag 91 is configured so that a portion of the welded portion 91a for welding the two sheet members 96 in a rectangular frame shape is not welded and is continuous with a welded portion 92a constituting the tube 92, thereby making the air bag 91 and the tube 92 fluidly continuous.

The connection portion 93 is, for example, a nipple. The connection portion 93 is provided at the distal end of the tube 92. Further, the distal end of the connection portion 93 is exposed to the outside from the sheet member 96 facing the curler 5 and the back plate 72, which is one of the two sheet members 96 constituting the tube 92.

As a specific example, the sensing cuff 73 includes a fifth sheet member 96a and a sixth sheet member 96b in this order from the living body side as illustrated in FIG. 7 and FIG. 8. Note that the sensing cuff 73 is formed by joining the sheet members 96 adjacent to each other by thermal welding.

For example, the fifth sheet member 96a and the sixth sheet member 96b are constituted in a shape capable of constituting the air bag 91 and the tube 92. The fifth sheet member 96a and the sixth sheet member 96b are disposed facing each other, thermally welded along the edge shapes of the air bag 91 and the tube 92 so that the air bag 91 and the tube 92 are fluidly continuous, and cut into predetermined shapes, thereby constituting the air bag 91 and the tube 92.

Further, the sixth sheet member 96b includes a hole portion 96b1 into which the distal end of the connection portion 93 can be inserted, for example. In the sixth sheet member 96b, the connection portion 93 is disposed in the hole portion 96b1, and a periphery of the hole portion 96b1 is thermally welded to the connection portion 93. The sixth sheet member 96b is joined to an inner circumferential surface of the back plate 72 via the joining layer 75.

The back-side cuff 74 is a so-called tensile cuff. The back-side cuff 74 is fluidly connected to the pump 14 through the flow path unit 15. The back-side cuff 74 is inflated to press the curler 5 such that the curler 5 is spaced apart from the wrist 200, pulling the belt 4 and the curler 5 toward the hand back side of the wrist 200. The back-side cuff 74 includes air bags 101 including a plurality of layers, for example, six layers, joined portions 102 provided on the air bag 101 facing the curler 5, and the connection portion 103 provided at the air bag 101 facing the curler 5. Such a back-side cuff 74 is formed by integrally welding a plurality of the sheet members 106.

Additionally, the back-side cuff 74 is configured such that the thickness of the back-side cuff 74 in an inflating direction during inflation is larger than the thickness of the palm-side cuff 71 in the inflating direction during inflation and than the thickness of the sensing cuff 73 in the inflating direction during inflation. In the present embodiment, the inflating direction is the direction in which the curler 5 and the wrist 200 face each other. Specifically, the air bags 101 of the back-side cuff 74 include more layers than the air bags 81 of the palm-side cuff 71 and the air bag 91 of the sensing cuff 73, and are thicker than the palm-side cuff 71 and the sensing cuff 73 when the air bags 101 are inflated from the curler 5 toward the wrist 200.

Here, the air bag 101 is a bag-like structure, and in the present embodiment, the blood pressure measurement device 1 is configured to use air with the pump 14, and thus the present embodiment will be described using the air bag. However, in a case where a fluid other than air is used, the bag-like structure may be a fluid bag such as a liquid bag. A plurality of the air bags 101 are stacked and are in fluid communication in the stacking direction.

Each of the air bags 101 is formed in a rectangular bag shape elongated in one direction. Further, a width in a lateral direction of the air bag 101 is set to be the same as the width in the lateral direction of the curler 5. The air bag 101 is formed by, for example, combining two sheet members 106 and thermally welding the sheet members 106 in a rectangular frame shape elongated in one direction, as illustrated by a welded portion 101a in FIG. 9, FIG. 10, FIG. 12, and FIG. 13. Further, the six-layer air bags 101 are formed by thermally welding and thus integrally combining six air bags 101, or by welding, to each other, the sheet members 106 of the adjacent air bags 101 facing each other and then welding the air bags 101, for example. The six-layer air bags 101 are fluidly continuous via openings provided in the sheet members 106 facing each other.

One or a plurality of the joined portions 102 are provided on at least a portion of an edge portion of the air bag 101 disposed adjacent to the curler 5. The joined portion 102 is formed by a portion of the sheet members 106 constituting the air bag 101.

In the present embodiment, description is made using an example in which two joined portions 102 are provided in the longitudinal direction of the air bag 101 at each of the edge portions of the air bag 101 in the lateral direction. Note that, for example, the air bag 101 is provided with the joined portions 102 at positions other than a position facing the cover portion 5a of the curler 5. Further, for example, the joined portion 102 includes a relief portion 102a for exposing, to the outside, a power supply terminal 8b described later of the power supply unit 8 provided on the curler 5 at an area facing the power supply terminal 8b. The relief portion 102a is, for example, an opening that can expose the power supply terminal 8b to the outside and, as an example, is circular.

The joined portions 102 are joined to at least the outer circumferential surface of the curler 5 when the back-side cuff 74 is disposed on the inner circumferential surface of the curler 5. Further, the joined portions 102 disposed at the same position in the lateral direction of the air bag 101 are layered and then welded.

Note that the lengths of the two joined portions 102 are set to be different in the lateral direction of the air bag 101, for example. In this example, the two joined portions 102 are layered and welded on the first end side of the curler 5 in the lateral direction. Note that, as long as the distal ends of the two joined portions 102 can be disposed on the outer circumferential surface of the curler 5, the two joined portions 102 may be set to appropriate lengths and it does not matter whether the joined portions 102 can or cannot be layered. When the joined portions 102 are set to be capable of being layered, the lengths are preferably set such that the distal ends do not extend outward of the outer edge of the outer circumferential surface of the curler 5.

The connection portion 103 is, for example, a nipple. The connection portion 103 is provided on a center side in the longitudinal direction of the air bag 101 disposed adjacent to the curler 5. A distal end of the connection portion 103 is exposed from the sheet member 106 facing the curler 5, which is one of the two sheet members 106 constituting the air bag 101.

As a specific example, as illustrated in FIG. 9 and FIG. 10, the back-side cuff 74 includes a seventh sheet member 106a, an eighth sheet member 106b, a ninth sheet member 106c, a tenth sheet member 106d, an eleventh sheet member 106e, a twelfth sheet member 106f, a thirteenth sheet member 106g, a fourteenth sheet member 106h, a fifteenth sheet member 106i, a sixteenth sheet member 106j, a seventeenth sheet member 106k, and an eighteenth sheet member 106l in this order from the living body side. Note that the back-side cuff 74 is integrally formed by joining the sheet members 106 adjacent to each other by thermal welding.

The seventh sheet member 106a to the eighteenth sheet member 106l are each constituted in a rectangular shape similar to that of the air bags 101. Edge portions of four sides of the seventh sheet member 106a are welded to corresponding edge portions of four sides of the eighth sheet member 106b to constitute a first-layer air bag 101. The eighth sheet member 106b and the ninth sheet member 106c are disposed facing each other, and include a plurality of openings 106b1 and 106c1 through which the two air bags 101 are fluidly continuous. Further, a periphery of the plurality of openings 106b1 and 106c1 is thermally welded in a four-sided frame shape smaller than that of the four sides by which the air bag 101 is welded, thereby the eighth sheet member 106b and the ninth sheet member 106c are integrally joined.

Edge portions of four sides of the ninth sheet member 106c are welded to corresponding edge portions of four sides of the tenth sheet member 106d to constitute a second-layer air bag 101.

The tenth sheet member 106d and the eleventh sheet member 106e are, as illustrated in FIG. 9 and FIG. 10, disposed facing each other, and include a plurality of openings 106d1 and 106e1 through which the two air bags 101 are fluidly continuous. Further, a periphery of the plurality of openings 106d1 and 106e1 is thermally welded in a four-sided frame shape smaller than that of the four sides by which the air bag 101 is welded, thereby the tenth sheet member 106d and the eleventh sheet member 106e are integrally joined. Edge portions of four sides of the eleventh sheet member 106e are welded to corresponding edge portions of four sides of the twelfth sheet member 106f to constitute a third-layer air bag 101.

The twelfth sheet member 106f and the thirteenth sheet member 106g are, as illustrated in FIG. 9 and FIG. 10, disposed facing each other, and include a plurality of openings 106f1 and 106g1 through which the two air bags 101 are fluidly continuous. Further, a periphery of the plurality of openings 106f1 and 106g1 is thermally welded in a four-sided frame shape smaller than that of the four sides by which the air bag 101 is welded, thereby the twelfth sheet member 106f and the thirteenth sheet member 106g are integrally joined. Edge portions of four sides of the thirteenth sheet member 106g are welded to corresponding edge portions of four sides of the fourteenth sheet member 106h to constitute a fourth-layer air bag 101.

The fourteenth sheet member 106h and the fifteenth sheet member 106i are, as illustrated in FIG. 9 and FIG. 10, disposed facing each other, and include a plurality of openings 106h1 and 106i1 through which the two air bags 101 are fluidly continuous. Further, a periphery of the plurality of openings 106h1 and 106i1 is thermally welded in a four-sided frame shape smaller than that of the four sides by which the air bag 101 is welded, thereby the fourteenth sheet member 106h and the fifteenth sheet member 106i are integrally joined. Edge portions of four sides of the fifteenth sheet member 106i are welded to corresponding edge portions of four sides of the sixteenth sheet member 106j to constitute a fifth-layer air bag 101.

The sixteenth sheet member 106j and the seventeenth sheet member 106k are, as illustrated in FIG. 9 and FIG. 10, disposed facing each other, and include a plurality of openings 106j1 and 106k1 through which the two air bags 101 are fluidly continuous. Further, the seventeenth sheet member 106k is constituted in a shape capable of constituting the air bag 101 and the joined portions 102, for example. A periphery of the plurality of openings 106j1 and 106k1 is thermally welded in a four-sided frame shape smaller than that of the four sides by which the air bag 101 is welded, thereby the sixteenth sheet member 106j and the seventeenth sheet member 106k are integrally joined. The seventeenth sheet member 106k and the eighteenth sheet member 106l are thermally welded along the edge shape of the air bag 101 and cut into a predetermined shape to constitute a sixth-layer air bag 101 and the joined portions 102.

Further, the eighteenth sheet member 106l includes a hole portion 106l1 into which the distal end of the connection portion 103 can be inserted, for example. In the eighteenth sheet member 106l, the connection portion 103 is disposed in the hole portion 106l1, and a periphery of the hole portion 106l1 is thermally welded to the connection portion 103. Further, the eighteenth sheet member 106l is joined to the inner circumferential surface of the curler 5 via the joining layer 75, and the joined portions 102 of the seventeenth sheet member 106k are joined to the outer circumferential surface of the curler 5 via the joining layer 75.

Additionally, each of the sheet members 86, 96, and 106 forming the palm-side cuff 71, the sensing cuff 73, and the back-side cuff 74 is formed of a thermoplastic resin material. The thermoplastic resin material is a thermoplastic elastomer. Examples of thermoplastic resin material constituting the sheet members 86, 96, and 106 include thermoplastic polyurethane based resin (hereinafter referred to as TPU), polyvinyl chloride resin, ethylene-vinyl acetate resin, thermoplastic polystyrene based resin, thermoplastic polyolefin resin, thermoplastic polyester based resin, and thermoplastic polyamide resin. Of at least the plurality of sheet members 86 and 106 constituting the air bags 81 and 101, at least the sheet members 86 and 106 of the palm-side cuff 71 and the sensing cuff 73 welded to the curler 5 are constituted by a material similar to the material of the curler 5.

For example, the sheet members 86, 96, and 106 are formed using a molding method such as T-die extrusion molding or injection molding. After being molded by each molding method, the sheet members 86, 96, and 106 are sized into predetermined shapes, and the sized individual members are joined by welding or the like to constitute the bag-like structures 81, 91, and 101. A high frequency welder or laser welding is used as the welding method.

The fluid circuit 7 is constituted by the case 11, the pump 14, the flow path unit 15, the on-off valves 16, the pressure sensors 17, the palm-side cuff 71, the sensing cuff 73, and the back-side cuff 74. A specific example of the fluid circuit 7 will be described below in which two on-off valves 16 that are used in the fluid circuit 7 are designated as a first on-off valve 16A and a second on-off valve 16B, and two pressure sensors 17 that are used in the fluid circuit 7 are designated as a first pressure sensor 17A and a second pressure sensor 17B.

As illustrated in FIG. 5, the fluid circuit 7 includes, for example, a first flow path 7a connecting from the pump 14 to the palm-side cuff 71 and the back-side cuff 74, a second flow path 7b constituted by branching from a middle portion of the first flow path 7a and connecting from the pump 14 to the sensing cuff 73, and a third flow path 7c connecting the first flow path 7a to the atmosphere. Additionally, the first flow path 7a includes the first pressure sensor 17A. The first on-off valve 16A is provided between the first flow path 7a and the second flow path 7b. The second flow path 7b includes the second pressure sensor 17B. The second on-off valve 16B is provided between the first flow path 7a and the third flow path 7c.

In the fluid circuit 7 as described above, the first on-off valve 16A and the second on-off valve 16B are closed to connect only the first flow path 7a to the pump 14, thus fluidly connecting the pump 14, the palm-side cuff 71, and the back-side cuff 74. In the fluid circuit 7, the first on-off valve 16A is opened and the second on-off valve 16B is closed to connect the first flow path 7a and the second flow path 7b, thus fluidly connecting the pump 14, the palm-side cuff 71, and the back-side cuff 74, as well as the pump 14 and the sensing cuff 73. In the fluid circuit 7, the first on-off valve 16A is closed and the second on-off valve 16B is opened to connect the first flow path 7a and the third flow path 7c, thus fluidly connecting the palm-side cuff 71, the back-side cuff 74, and the atmosphere. In the fluid circuit 7, the first on-off valve 16A and the second on-off valve 16B are opened to connect the first flow path 7a, the second flow path 7b, and the third flow path 7c, thus fluidly connecting the palm-side cuff 71, the sensing cuff 73, the back-side cuff 74, and the atmosphere.

As illustrated in FIG. 5, the power supply unit 8 is provided in a recess provided on the outer surface of the first end side of the curler 5 protruding from the device body 3, that is, the recess provided adjacent to the cover portion 5a on the outer surface of the curler 5 from the cover portion 5a to the short-end side. For example, the power supply unit 8 is inserted when the curler 5 is molded. As illustrated in FIG. 6, the power supply unit 8 is configured to be connectable to a connector provided at a distal end of a charging cable of a charger, and the connector is configured to be fixable.

The power supply unit 8 includes a wire portion 8a, the power supply terminal 8b, and a cover 8c that covers the wire portion 8a disposed in the recess of the curler 5. The wiring portion 8a is connected to the power supply terminal 8b at one end, and to the control unit 55 at the other end. The power supply terminal 8b is constituted by two terminals having a circular shape, for example.

Next, an example of measurement of a blood pressure value using the blood pressure measurement device 1 will be described using FIG. 18 to FIG. 21. FIG. 18 is a flowchart illustrating an example of a blood pressure measurement using the blood pressure measurement device 1, illustrating both an operation of a user and an operation of the control unit 55. Additionally, FIG. 19 to FIG. 21 illustrate an example of the user attaching the blood pressure measurement device 1 to the wrist 200.

First, the user attaches the blood pressure measurement device 1 to the wrist 200 (step ST1). As a specific example, for example, the user inserts one of the wrists 200 into the curler 5, as illustrated in FIG. 19.

At this time, in the blood pressure measurement device 1, the device body 3 and the sensing cuff 73 are disposed at opposite positions in the curler 5, and thus the sensing cuff 73 is disposed in a region on the palm side of the wrist 200 in which the artery 210 resides. Thus, the device body 3 and the back-side cuff 74 are disposed on the hand back side of the wrist 200. Then, as illustrated in FIG. 20, the user passes the second belt 62 through the frame body 61e of the buckle 61b of the first belt 61 with the hand opposite to the hand on which the blood pressure measurement device 1 is disposed. The user then pulls the second belt 62 to bring the member on the inner circumferential surface side of the curler 5, that is, the cuff structure 6, into close contact with the wrist 200, and inserts the prong 61f into the small hole 62a. Thus, as illustrated in FIG. 4 and FIG. 21, the first belt 61 and the second belt 62 are connected, and the blood pressure measurement device 1 is attached to the wrist 200.

Then, the user operates the operation unit 13 to input an instruction corresponding to the start of measurement of the blood pressure value. The operation unit 13, on which an input operation of the instruction has been performed, outputs an electrical signal corresponding to the start of the measurement to the control unit 55 (step ST2). The control unit 55 receives the electrical signal, and then for example, opens the first on-off valve 16A, closes the second on-off valve 16B, and drives the pump 14 to feed compressed air to the palm-side cuff 71, the sensing cuff 73, and the back-side cuff 74 through the first flow path 7a and the second flow path 7b (step ST3). Thus, the palm-side cuff 71, the sensing cuff 73, and the back-side cuff 74 start to be inflated.

The first pressure sensor 17A and the second pressure sensor 17B detect the pressures in the palm-side cuff 71, the sensing cuff 73, and the back-side cuff 74, and outputs, to the control unit 55, electrical signals corresponding to the pressures (step ST4). Based on the received electrical signals, the control unit 55 determines whether the pressures in the internal spaces of the palm-side cuff 71, the sensing cuff 73, and the back-side cuff 74 have reached a predetermined pressure for measurement of the blood pressure (step ST5). For example, in a case where the internal pressures of the palm-side cuff 71 and the back-side cuff 74 have not reached the predetermined pressure and the internal pressure of the sensing cuff 73 has reached the predetermined pressure, the control unit 55 closes the first on-off valve 16A and feeds compressed air through the first flow path 7a.

When the internal pressures of the palm-side cuff 71 and the back-side cuff 74 and the internal pressure of the sensing cuff 73 all have reached the predetermined pressure, the control unit 55 stops driving the pump 14 (YES in step ST5). At this time, as illustrated by the two-dot chain line in FIG. 4, the palm-side cuff 71 and the back-side cuff 74 are sufficiently inflated, and the inflated palm-side cuff 71 presses the back plate 72. Additionally, the back-side cuff 74 presses the curler 5 in a direction away from the wrist 200, and then the belt 4, the curler 5, and the device body 3 move in a direction away from the wrist 200. As a result, the palm-side cuff 71, the back plate 72, and the sensing cuff 73 are pulled toward the wrist 200 side. In addition, when the belt 4, the curler 5, and the device body 3 move in a direction away from the wrist 200 due to the inflation of the back-side cuff 74, the belt 4 and the curler 5 move toward both lateral sides of the wrist 200, and the belt 4, the curler 5, and the device body 3 move in a state of close contact with both lateral sides of the wrist 200. Thus, the belt 4 and the curler 5, which are in close contact with the skin of the wrist 200, pull the skin on both lateral sides of the wrist 200 toward the hand back side. Note that the curler 5 may be configured to indirectly contact the skin of the wrist 200 via the sheet members 86 and 106, for example, as long as the curler 5 can pull the skin of the wrist 200.

Further, the sensing cuff 73 is inflated by being fed with a predetermined amount of air such that the internal pressure reaches the pressure required to measure blood pressure, and is pressed toward the wrist 200 by the back plate 72 that is pressed by the palm-side cuff 71. Thus, the sensing cuff 73 presses the artery 210 in the wrist 200 and occludes the artery 210 as illustrated in FIG. 22.

Additionally, the control unit 55, for example, controls the second on-off valve 16B and repeats the opening and closing of the second on-off valve 16B, or adjusts the degree of opening of the second on-off valve 16B to pressurize the internal space of the palm-side cuff 71. In the process of pressurization, based on the electrical signal output by the second pressure sensor 17B, the control unit 55 obtains measurement results such as blood pressure values, for example, the systolic blood pressure and the diastolic blood pressure, and the heart rate and the like (step ST6). The control unit 55 outputs an image signal corresponding to the obtained measurement results to the display unit 12, and displays the measurement results on the display unit 12 (step ST7). In addition, after the end of the blood pressure measurement, the control unit 55 opens the first on-off valve 16A and the second on-off valve 16B.

The display unit 12 receives the image signal, and then displays the measurement results on the screen. The user views the display unit 12 to confirm the measurement results. Note that, after the end of the measurement, the user removes the prong 61f from the small hole 62a, removes the second belt 62 from the frame body 61e, and removes the wrist 200 from the curler 5, thus removing the blood pressure measurement device 1 from the wrist 200.

The blood pressure measurement device 1 according to one embodiment configured in this manner has a configuration in which the palm-side cuff 71 and the back-side cuff 74 serving as the cuffs are provided with the joined portions 82 and 102 to be joined to the curler 5 via the joining layer 75. Further, the joined portions 82 and 102 are joined to the outer circumferential surface of the curler 5.

Thus, in the blood pressure measurement device 1, even if the fourth sheet member 86d and the eighteenth sheet member 106l on the inner circumferential surface side of the curler 5 deform when the air bags 81 and 101 are inflated, the joined portions 82 and 102 are positioned on the outer circumferential surface side of the curler 5 and thus do not deform. As a result, when the air bags 81 and 101 are inflated, the stress applied to the joining layer 75 between the joined portions 82 and 102 and the outer circumferential surface of the curler 5 is applied in a shear direction along a surface direction of the outer circumferential surface of the curler 5. Thus, the stress applied between the curler 5 and the cuff structure 6 when the air bags 81 and 101 are inflated can be reduced, making it possible to suppress the peeling of the palm-side cuff 71 and the back-side cuff 74 from the curler 5 even if the joining strength of the adhesive, double-sided tape, or the like used for the joining layer 75 is the same as that of the adhesive, double-sided tape, or the like used in the related art.

This effect will be described in detail using FIG. 23. Note that FIG. 23 is an explanatory diagram illustrating an example of the direction of stress that occurs in the joined portions 82 and 102 of the cuffs 71 and 74 of the present embodiment and the direction of stress that occurs in the sheet members 86 and 106 of the cuff in the related art example. Note that the blood pressure measurement device in the related art example of FIG. 23 does not include the joined portions 82 and 102.

In the blood pressure measurement device of the related art example, only the fourth sheet member 86d and the eighteenth sheet member 106l are directly joined to the curler 5 without including the joined portions 82. In this case, the central sides of the air bags 81 and 101 are inflated to a greater extent than the end portion sides of the air bags 81 and 101. Thus, the central sides of the air bags 81 and 101 are maintained in a state of being joined to the curler 5, but a force in a direction away from the curler 5 is applied to the end portion sides of the air bags 81 and 101.

As a result, in a configuration in which the joined portions 82 are not included, the stress applied to the joining layer 75 joining the air bags 81 and 101 to the curler is concentrated on the edge sides of the air bags 81 and 101. Thus, as indicated by the arrows in the related art example of FIG. 23, stress occurs in the joining layer 75 to cause the sheet members 86 and 106 to peel away from the curler 5 from the edge sides of the air bags 81 and 101. Thus, as the air bags 81 and 101 are repeatedly inflated and deflated, there is a risk that the air bags 81 and 101 will be peeled away from the curler 5. This in particular occurs when the width for joining decreases, and thus there is a risk that the air bags 81 and 101 will peel away from the curler 5 from the edges of the air bags 81 and 101 in the width direction orthogonal to the longitudinal direction.

Nevertheless, in the blood pressure measurement device 1 of the present embodiment, the joined portions 82 and 102 are disposed on the outer circumferential surface of the curler 5, and the outer circumferential surface of the curler 5 and the joined portions 82 and 102 are joined by the joining layer 75. Thus, when the air bags 81 and 101 are inflated, the joined portions 82 are pulled in the surface direction of the outer circumferential surface of the curler 5 or in a direction close to the surface direction. Thus, the force applied to the joining layer 75 is a force in the shear direction, as indicated by the arrow in the embodiment of FIG. 23. That is, because the stress applied to the joining layer 75 is shear stress in the surface direction of the outer circumferential surface of the curler 5, the joining area can be maintained. For this reason, the air bags 81 and 101 being joined to the curler 5 via the joined portions 82 and 102 can better suppress the peeling of the cuffs 71 and 74 from the curler 5 than the air bag 81 and 101 being directly joined to the curler 5 without the joined portions 82 and 102 in the related art example.

With the joined portions 82 and 102 thus provided, the blood pressure measurement device 1 can suppress the peeling of the air bags 81 and 101 from the curler 5 from the edge portion sides. In addition, the joining layer 75 is provided between the inner circumferential surface of the curler 5 and the fourth sheet member 86d and the eighteenth sheet member 106l facing the inner circumferential surface of the curler 5 Thus, the air bags 81 and 101 are joined to the inner circumferential surface of the curler 5 as well. Thus, the joining area in which the cuffs 71 and 74 are joined to the curler 5 can be maintained. With the joined portions 82 and 102 thus provided, the blood pressure measurement device 1 can suppress the peeling of the curler 5 and the cuff structure 6.

As a result, the blood pressure measurement device 1 has high durability even with repeated inflation and deflation of the cuff structure 6, and can perform blood pressure measurement with high accuracy for an extended period of time.

Further, because the blood pressure measurement device 1 can suppress the peeling of the curler 5 and the cuff structure 6, the width of the air bags 81 and 101 in the direction orthogonal to the longitudinal direction can be reduced. Thus, the blood pressure measurement device 1 can be miniaturized.

Further, in the blood pressure measurement device 1, the force that occurs in the joining layer 75 between the joined portions 82 and 102 and the curler 5 can be a force in the shear direction. Thus, the blood pressure measurement device 1 can suppress deformation of the curler 5 caused by repeated use.

To describe this effect with a specific example, it is conceivable that a material that can firmly join members may be used for the joining layer 75 such as an adhesive, or double-sided tape to make the cuff structure 6 less susceptible to being peeled from the curler 5 and that a cuff structure has a related-art structure in which the joined portions 82 and 102 are not used may be joined to the curler 5. Nevertheless, when a material having high joining properties is used for the joining layer 75, some mechanical properties of the curler 5 may results in a risk that the curler 5 will bend following the inflation of the cuff structure 6. When the cuff structure 6 is repeatedly inflated and deflated in a state in which the curler 5 bends following the inflation of the cuff structure 6, the curler 5 is creep-deformed to have a bent shape, resulting in a risk that a suitable blood pressure measurement will not be possible.

In contrast, in the blood pressure measurement device 1 of the present embodiment, a material capable of firmly joining members is not provided to the joining layer 75, and the joined portions 82 and 102 are joined to the outer circumferential surface of the curler 5. As a result, the stress that occurs in the joining portions of the curler 5 and the cuff structure 6 can be reduced, and the direction of that stress is along the surface direction of the outer circumferential surface of the curler 5. Thus, because the bending of the curler 5 following the inflation of the cuff structure 6 can be suppressed, the blood pressure measurement device 1 can suppress deformation of the curler 5 and thus suppress a decrease in the accuracy of the blood pressure measurement caused by deformation of the curler 5.

As a result, the blood pressure measurement device 1 can be miniaturized and highly accurate blood pressure measurement can be stably performed for an extended period of time.

Further, the blood pressure measurement device 1 has a configuration in which the joined portions 82 and 102 in the lateral direction of the air bags 81 and 101 are layered and joined. Thus, in addition to the curler 5 and the joined portions 82 and 102 being joined via the joining layer 75, the joined portions 82 and 102 are joined to each other. Thus, when an external force is applied to the joined portions 82 and 102 in a direction away from the curler 5, separation from the curler 5 is suppressed by the joining of the joined portions 82 and 102 by the joining layer 75 between the curler and the joined portions 82 and 102 as well as by the joining of the joined portions 82 and 102 to each other.

Further, the layered joined portions 82 and 102 are configured to be thermally welded, making it possible to firmly join the layered joined portions 82 and 102. With the joined portions 82 and 102 being thus layered and joined, the blood pressure measurement device 1 can prevent the joined portions 82 and 102 from being peeled away from the outer circumferential surface of the curler 5 when an external force is applied to the joined portions 82 and 102, such as during use of the blood pressure measurement device 1. Further, the joined portions 82 and 102 have a simple configuration formed by the sheet members 86 and 106, making manufacture easy.

Further, in the respective configurations of the cuffs 71 and 74 of the blood pressure measurement device 1, the joined portions 82 and 102 are formed by the sheet members 86c and 106k of the sheet members 86 and 106 constituting the air bags 81 and 101, the sheet members 86c and 106k being welded to the sheet members 86d and 106l of the air bags 81 and 101 adjacent to the curler 5, the sheet members 86d and 106l being joined to the inner circumferential surface of the curler 5. According to this configuration, the end portions of the sheet members 86d and 106l in the lateral direction, which are adjacent to the curler 5, are covered by the sheet members 86c and 106k forming the joined portions 82 and 102. Thus, an appearance of the cuffs 71 and 74 can be improved.

Further, because the areas of the joined portions 82 and 102 joined to the outer circumferential surface side of the curler 5 are each formed by one sheet member 86 and 106, the blood pressure measurement device 1 can suppress an increase in the thickness of the curler 5 and the cuffs 71 and 74 when the curler 5 and the cuffs 71 and 74 are integrated.

As described above, according to the blood pressure measurement device 1 according to the present embodiment, it is possible to suppress the peeling of the curler 5 and the cuff structure 6.

Note that the present invention is not limited to the embodiments described above. In the examples described above, a configuration of the cuffs 71 and 74 has been described in which the joined portions 82 and 102 provided in the lateral direction of the air bags 81 and 101 are layered and welded in the lateral direction of the air bags 81 and 101, but no such limitation is intended. For example, as in the cuffs 71 and 74 of the modified example illustrated in FIG. 24, a configuration may be adopted in which the joined portions 82 and 102 are not layered.

Further, in the example described above, a configuration of the cuffs 71 and 74 has been described in which the width of the air bag 81 in the lateral direction is set to be the same as the width of the curler 5 in the lateral direction, and the air bags 81 and 101 are disposed only on the inner circumferential surface of the curler 5, but no such limitation is intended. For example, as in the cuffs 71 and 74 of the modified examples illustrated in FIG. 25 to FIG. 27, a configuration may be adopted in which the air bags 81 and 101 are provided on the inner circumferential surface of the curler 5 as well as over the side surfaces and the outer circumferential surface side of the curler 5.

In the modified example illustrated in FIG. 25, in the cuffs 71 and 74, regions where the air bags 81 and 101 are inflated are disposed on the inner circumferential surface of the curler 5, and the welded portions 81a and 101a of the air bags 81 and 101 are disposed on the side surfaces of the curler 5. Further, in the modified examples illustrated in FIG. 26 and FIG. 27, in the cuffs 71 and 74, regions where the air bags 81 and 101 are inflated are disposed on the inner circumferential surface and side surfaces of the curler, and the welded portions 81a and 101a of the air bags 81 and 101 are disposed on the outer circumferential surface of the curler 5. By adopting a configuration in which the air bags 81 and 101 are provided on the inner circumferential surface of the curler 5 as well as over the side surfaces and the outer circumferential surface of the curler 5 as in these modified examples, the blood pressure measurement device 1 can increase the region where the wrist 200 can be pressurized, making it possible to improve the blood pressure measurement accuracy.

Further, in the examples described above, a configuration has been described in which the two joined portions 102 are layered and welded on one end side of the curler 5 in the lateral direction, but no such limitation is intended. For example, as illustrated in FIG. 27, a configuration may be adopted in which the two joined portions 102 are layered and welded in the center of the curler 5 in the lateral direction.

Further, in the examples described above, a configuration of the cuffs 71 and 74 has been described in which the joined portions 82 and 102 are formed by cutting the sheet members 86 and 106 into predetermined shapes, but a configuration may be adopted in which the joined portions 82 and 102 are formed into bag shapes into which the curler 5 can be inserted, as in the modified example illustrated in FIG. 28, for example. Further, in the examples described above, a configuration has been described in which the joined portions 82 and 102 are each formed by one sheet member 86 and 106, but no such limitation is intended. For example, the joined portions 82 and 102 may each be formed by two sheet members 86 and 106 respectively forming the air bags 81 and 101 adjacent to the curler 5.

Further, in the examples described above, a configuration of the cuffs 71 and 74 has been described in which the joined portions 82 and 102 are formed by, of the sheet members 86 and 106 constituting the air bags 81 and 101, the sheet members 86 and 106 welded to the sheet members 86 and 106 of the air bags 81 and 101 adjacent to the curler 5 that are joined to the inner circumferential surface of the curler 5, but no such limitation is intended. For example, of the sheet members 86 and 106 constituting the air bags 81 and 101, the joined portions 82 and 102 may be formed by the sheet members 86 and 106 of the air bags 81 and 101 adjacent to the curler 5 that are joined to the inner circumferential surface of the curler 5.

Further, in the examples described above, a configuration has been described in which the joined portions 102 of the back-side cuff 74 are provided on the air bag 101 at positions other than a position facing the cover portion 5a of the curler 5, but no such limitation was intended. A configuration may be adopted in which the joined portions 102 are further provided at a position facing the cover portion 5a, cover the cover portion 5a, and are joined to the cover portion 5a via the joining layer 75.

Further, in the examples described above, the curler 5 includes the cover portion 5a, and the back lid that covers the outer case 31 on the living body side is constituted by the cover portion 5a and the back cover 35, but no such limitation is intended. That is, a configuration may be adopted in which the blood pressure measurement device 1 includes a back lid that covers the outer case 31 on the living body side without including the back cover 35 and the cover portion 5a, and the curler 5 is fixed to the back lid.

Further, in the examples described above, the configuration including the two on-off valves 16 of the first on-off valve 16a and the second on-off valve 16b has been described, but no such limitation is intended. For example, a configuration may be adopted in which four on-off valves 16 are provided.

For example, the timings when the first on-off valve 16A and the second on-off valve 16B are opened and closed during blood pressure measurement by the blood pressure measurement device 1 are not limited to the timings in the examples described above, and can be set as appropriate. Additionally, the example has been described in which the blood pressure measurement device 1 performs blood pressure measurement by calculating the blood pressure from the pressure measured during the process of pressurizing the palm-side cuff 71. However, no such limitation is intended and the blood pressure may be calculated during the depressurization process or during both the pressurization process and the depressurization process.

Additionally, in the examples described above, the configuration has been described in which the back plate 72 includes the plurality of grooves 72a, but no such limitation is intended. For example, for control of deformability and the like, the number, the depth, and the like of the plurality of grooves 72a may be set as appropriate, and the back plate 72 may be configured to include a member that suppresses deformation.

Furthermore, in the example described above, the blood pressure measurement device 1 has been described using an example of a wearable device attached to the wrist 200, but no such limitation is intended. For example, the blood pressure measurement device may be a blood pressure measurement device 1A configured to measure blood pressure while wrapped around an upper arm. Hereinafter, as a second embodiment, the blood pressure measurement device 1A will be described with reference to FIG. 29 and FIG. 30. Note that, among the configurations of the present embodiment, configurations similar to those of the blood pressure measurement device 1 according to the first embodiment described above are given the same reference signs, and descriptions and illustrations thereof are omitted as appropriate.

For example, as illustrated in FIG. 29 and FIG. 30, the blood pressure measurement device 1A according to the second embodiment includes a device body 3A and a cuff structure 6A. The device body 3A includes, for example, a case 11A, a display unit 12, an operation unit 13, a pump 14, a flow path unit 15, an on-off valve 16, a pressure sensor 17, a power supply unit 18, and a control substrate 20. As illustrated in FIG. 29, the device body 3A includes the single pump 14, the single on-off valve 16, and the single pressure sensor 17.

The case 11A is, for example, constituted in a box-like shape. The case 11A includes an attachment portion 11a that fixes the cuff structure 6A. The attachment portion 11a is, for example, an opening provided on a rear surface of the case 11A.

As illustrated in FIG. 29 and FIG. 30, the cuff structure 6A includes a curler 5A made of a thermoplastic resin material, a pressing cuff 71A made of a thermoplastic resin material and provided on the living body side of the curler 5A, and a bag-like cover body 76 composed of a fabric or the like with the curler 5A and the pressing cuff 71A disposed in an interior thereof. The cuff structure 6A is wrapped around the upper arm.

The curler 5A includes, for example, a protruding portion 5d fixed to the attachment portion 11a.

The pressing cuff 71A includes an air bag 81A, joined portions 82 provided on the air bag 81A, and a tube provided to the air bag 81A and fluidly connected to the flow path unit 15. The pressing cuff 71A is accommodated in the bag-like cover body 76 together with the curler 5A, and the air bag 81A is disposed on the inner circumferential surface of the curler 5A, and the joined portions 82 are joined to the outer circumferential surface of the curler 5A via the joining layer 75. Note that the air bag 81A may also be joined to the curler 5A via the joining layer 75 as well.

Each of the air bags 81A is constituted in a rectangular shape elongated in one direction. The air bag 81A is formed by, for example, combining two sheet members 86 elongated in one direction, and thermally welding the edge portions of the sheet members 86. As a specific example, the air bag 81A includes, as illustrated in FIG. 24, a first sheet member 86a and a second sheet member 86b in this order from the living body side. The second sheet member 86b constitutes the air bag 81A along with the first sheet member 86a. The joined portions 82 are formed, for example, on one of the two sheet members 86 constituting the air bag 81A, for example, on the second sheet member 86b.

As with the blood pressure measurement device 1 according to the first embodiment described above, the blood pressure measurement device 1A thus configured can be miniaturized, and stably perform a highly accurate blood pressure measurement for an extended period of time.

In other words, the embodiments described above are mere examples of the present invention in all respects. Of course, various modifications and variations can be made without departing from the scope of the present invention. Thus, specific configurations in accordance with an embodiment may be adopted as appropriate at the time of carrying out the present invention.

REFERENCE SIGNS LIST

- 1, 1A Blood pressure measurement device
- 3, 3A Device body
- 4 Belt
- 5, 5A Curler
- 5a Cover portion
- 5b Screw hole
- 5c Hole portion
- 5d Protruding portion
- 6, 6A Cuff structure
- 7 Fluid circuit
- 7a First flow path
- 7b Second flow path
- 7c Third flow path
- 8 Power supply unit
- 8a Wire portion
- 8b Power supply terminal
- 8c Cover
- 11, 11A Case
- 11a Attachment portion
- 12 Display unit
- 13 Operation unit
- 14 Pump
- 15 Flow path unit
- 16 On-off valve
- 16A First on-off valve
- 16B Second on-off valve
- 17 Pressure sensor
- 17A First pressure sensor
- 17B Second pressure sensor
- 18 Power supply unit
- 19 Vibration motor
- 20 Control substrate
- 31 Outer case
- 31a Lug
- 31b Spring rod
- 32 Windshield
- 33 Base
- 35 Back cover
- 35a Screw
- 41 Button
- 42 Sensor
- 43 Touch panel
- 51 Substrate
- 52 Acceleration sensor
- 53 Communication unit
- 54 Storage unit
- 55 Control unit
- 56 Main CPU
- 57 Sub-CPU
- 61 First belt
- 61a Belt portion
- 61b Buckle
- 61c First hole portion
- 61d Second hole portion
- 61e Frame body
- 61f Prong
- 62 Second belt
- 62a Small hole
- 62b Third hole portion
- 71 Palm-side cuff (cuff)
- 71A Pressing cuff
- 72 Back plate
- 72a Groove
- 73 Sensing cuff
- 74 Back-side cuff (cuff)
- 75 Joining layer
- 76 Bag-like cover body
- 81, 81A Bag-like structure (air bag)
- 81a Welded portion
- 82 Joined portion
- 83 Tube
- 83a Welded portion
- 84 Connection portion
- 86 Sheet member
- 86a First sheet member
- 86b Second sheet member
- 86b1 Opening
- 86c Third sheet member
- 86c1 Opening
- 86d Fourth sheet member
- 86d1 Hole portion
- 91 Bag-like structure (air bag)
- 91a Welded portion
- 92 Tube
- 92a Welded portion
- 93 Connection portion
- 96 Sheet member
- 96a Fifth sheet member
- 96b Sixth sheet member
- 96b1 Hole portion
- 101 Bag-like structure (air bag)
- 101a Welded portion
- 102 Joined portion
- 102a Relief portion
- 103 Connection portion
- 106 Sheet member
- 106a Seventh sheet member
- 106b Eighth sheet member
- 106b1 Opening
- 106c Ninth sheet member
- 106c1 Opening
- 106d Tenth sheet member
- 106d1 Opening
- 106e Eleventh sheet member
- 106e1 Opening
- 106f Twelfth sheet member
- 106f1 Opening
- 106g Thirteenth sheet member
- 106g1 Opening
- 106h Fourteenth sheet member
- 106h1 Opening
- 106i Fifteenth sheet member
- 106i1 Opening
- 106j Sixteenth sheet member
- 106j1 Opening
- 106k Seventeenth sheet member
- 106k1 Opening
- 106l Eighteenth sheet member
- 106l1 Hole portion 200 Wrist
210 Artery

The invention claimed is:

1. A blood pressure measurement device comprising:
a curler that is configured to curve to follow a circumferential direction of a site of a living body where the curler is configured to be attached; and
a cuff including:
   a plurality of bag-like structures layered on one another, each of the plurality of bag-like structures being elongated in one direction, formed by welding two sheet members formed of a resin material, and configured to be inflated with a fluid, and
   a plurality of joined portions each provided on at least a portion of an edge portion of one of the bag-like structures that is disposed facing the curler, the joined portions each being formed by a portion of the sheet members constituting the one of the bag-like structures that is disposed facing the curler and joined to an outer circumferential surface side of the curler, wherein
a region where the one of the bag-like structures is inflated is disposed on an inner circumferential surface of the curler, and a welded portion of the two sheet members of the one of the bag-like structures is disposed on a side surface of the curler,
the curler includes a cover portion located at one end side of the curler, the cover portion configured to have a device body provided thereto, and
the joined portions are each provided on at least the portion of the edge portion of the one of the bag-like structures except at a position facing the cover portion.

2. The blood pressure measurement device according to claim 1, wherein
the joined portions are provided on each edge portion of the one of the bag-like structures in a lateral direction.

3. The blood pressure measurement device according to claim 2, wherein
the joined portions provided at each edge portion of the one of the bag-like structures in the lateral direction are layered on the outer circumferential surface side of the curler and integrally joined.

4. The blood pressure measurement device according to claim 3, wherein
the joined portions being layered are joined by welding.

5. The blood pressure measurement device according claim 2, wherein
the one of the bag-like structures has a width in the lateral direction greater than or equal to a width of the curler in the lateral direction.

6. The blood pressure measurement device according to claim 1, further comprising:
a joining layer provided between the joined portions and the curler and configured to join the joined portions and the curler.

7. The blood pressure measurement device according to claim 6, wherein
the joining layer is further provided between the one of the bag-like structures and the inner circumferential surface of the curler.

8. The blood pressure measurement device according to claim 6, wherein
the joining layer is double-sided tape.

9. The blood pressure measurement device according to claim 1, wherein
the joined portions are formed by one of the sheet members at an area facing an outer circumferential surface of the curler.

* * * * *